United States Patent
Forstall et al.

(10) Patent No.: US 7,788,248 B2
(45) Date of Patent: Aug. 31, 2010

(54) IMMEDIATE SEARCH FEEDBACK

(75) Inventors: Scott James Forstall, Mountain View, CA (US); Donald D. Melton, San Carlos, CA (US); John William Sullivan, Pacific Grove, CA (US); Darin Benjamin Adler, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1070 days.

(21) Appl. No.: 11/076,473

(22) Filed: Mar. 8, 2005

(65) Prior Publication Data

US 2006/0206454 A1 Sep. 14, 2006

(51) Int. Cl.
*G06F 7/00* (2006.01)
(52) U.S. Cl. ........................ 707/706; 707/736
(58) Field of Classification Search .................. None
See application file for complete search history.

(56) References Cited

U.S. PATENT DOCUMENTS

| | | | |
|---|---|---|---|
| 4,704,703 A | | 11/1987 | Fenwick |
| 5,692,173 A | * | 11/1997 | Chew .............................. 707/3 |
| 6,434,547 B1 | * | 8/2002 | Mishelevich et al. ........... 707/3 |
| 2003/0033288 A1 | * | 2/2003 | Shanahan et al. ............... 707/3 |
| 2003/0131106 A1 | * | 7/2003 | Kasriel ....................... 709/225 |
| 2004/0064447 A1 | * | 4/2004 | Simske et al. .................. 707/5 |
| 2005/0283468 A1 | * | 12/2005 | Kamvar et al. ................. 707/3 |

OTHER PUBLICATIONS

Internet Explorer 6. "How and Why to Clear your Cache", Windows, Mar. 2004.*
Google~Guide. "An Interactive Tutorial on Making Searching Even Easier", 2004.*
Watanabe, David, Inquisitor. Web Search Revelation, Nov. 23, 2003, 2 pages, http://www.inquisitorx.com/.
Watanabe, David, Screenshot of Inquisitor, After Jan. 5, 2004, 1 page, Version 0.67.
Author Unkown, Livesearch from Bitflux Blog Wiki, date unknown, Not After Sep. 21, 2004, 3 pages, http://blog.bitflux.ch/wiki/LiveSearch.
Watanabe, David, Spotlight-like livesearch added, May 7, 2004, 9 pages, http://blog.bitflux.ch/archive/spotlight$_{13}$like_livesearch_added.html.
Watanabe, David, Sciforums.com Inquisitor, May 24, 2004, 1 page, http://sciforums.com/showthread.php?t=36621.

* cited by examiner

*Primary Examiner*—Charles Rones
*Assistant Examiner*—Yuk Ting Choi
(74) *Attorney, Agent, or Firm*—Blakely, Sokoloff, Taylor & Zafman LLP

(57) ABSTRACT

Providing immediate search feedback is disclosed. Search input is received within a search field of a web browser application. Based on characteristics of the search input, a determination is made whether to automatically submit a query to a search engine. In one aspect, the query is automatically submitted to the search engine. The query is based on the received first search input. Results are displayed within the web browser application, the results web page returned from the query submitted to the search engine.

91 Claims, 13 Drawing Sheets

IMMEDIATE SEARCH FEEDBACK

TECHNICAL FIELD

This disclosure relates generally to user interfaces for digital processing systems, and in particular, relates to a graphical user interface that presents immediate search feedback.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©2004, Apple Computer, Inc., All Rights Reserved.

BACKGROUND INFORMATION

Users of modern data processing systems, such as general purpose computer systems, often desire to find information stored on remote computer systems or networks, such as for example information accessible through the Internet. The Internet is typically defined as a computer network consisting of a worldwide network of computer networks that use the TCP/IP network protocols to facilitate data transmission and exchange. One common method for locating information available on the Internet is to submit a search request or query to a search engine. A search engine is typically a computer program that retrieves documents, files or data from a database or from a computer network, such as the Internet, usually based on keywords input by a user. The search engine may include functionality for searching the Internet in general, or the search engine may be limited to a particular network, domain, website, or computing system accessible through the Internet. A user typically interacts with a search engine through a graphical user interface (GUI), in which the user inputs text describing the desired search terms or parameters. Search engines are often accessible by a user through a GUI of a web browser application. FIG. 1 generally describes a prior art method 100 of performing an Internet search. In use, a user is typically presented with an input field in which to enter text describing the information sought. Once a user has completely entered the desired search terms 102, the user enters an express command 104 to submit the search request to the search engine, such as for example by depressing the "Return" or "Enter" key on a keyboard, or clicking a GUI element, such as a "Submit" button within the browser application or on a web page presented by a web browser application. The search request is then submitted 106 to the search engine based on the complete search terms input by the user. Results from the search request, typically in the form of links to other websites, documents or files, are then presented to the user for review and selection 108. Should a user desire to refine or revise the search terms 110, the user may add to or modify the text previously entered into the input field, and then is required to again manually submit the search request by entering a submit command, such as by depressing a "Return" button.

While the conventional interaction between user and search engine (e.g. completely entering search terms, manually submitting them, waiting for the results to be displayed, reviewing the results, modifying the search terms, manually resubmitting the search request, etc.) is the conventional paradigm, there are drawbacks and inefficiencies associated with this process. For example, a user must wait until the search terms have been completely typed in by the user before any results are displayed. Furthermore, a user must proactively issue a submit command in order for an input search request to be submitted to the search engine, which can be tedious.

SUMMARY OF THE DESCRIPTION

The present invention relates to immediate search feedback. In one aspect, as a user enters search terms for submission to a search engine, results based on the received input appear as the user is typing. Search query strings are automatically submitted to a search engine using received portions of the input text.

In one aspect, immediate search feedback is provided. Search input is received within a search field of a web browser application. Based on characteristics of the search input, a determination is made whether to automatically submit a query to a search engine. In one aspect, the query is automatically submitted to the search engine. The query is based on the received search input. Results are presented in a results web page displayed by the web browser application. The results web page is received in response from the query submitted to the search engine. In one aspect, the search field is included in a web page presented by the web browser application.

In another aspect, text input is received within an integrated search field of a web browser application. Based on characteristics of the text input, a determination is made whether to automatically submit a query to a search engine. The query is then automatically submitted to the search engine. The query is based on the received search input. A web page returned from the search engine based on the query is displayed within the web browser application. After the returned web page is displayed, the focus is automatically maintained within the integrated search field. In one aspect, the returned web page is prevented from controlling the focus.

In another aspect, text input is received within a search field of a web page displayed by a web browser application. A determination is made, based on characteristics of the text input, whether to automatically submit a query to an Internet search engine. The query is automatically submitted to the search engine. The query is based on the received search input. Results returned from the query submitted to the search engine are presented within the web page. In one aspect, the search field for receiving text input is presented within a first frame of the web page, and the first results are presented within a second frame of the web page.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
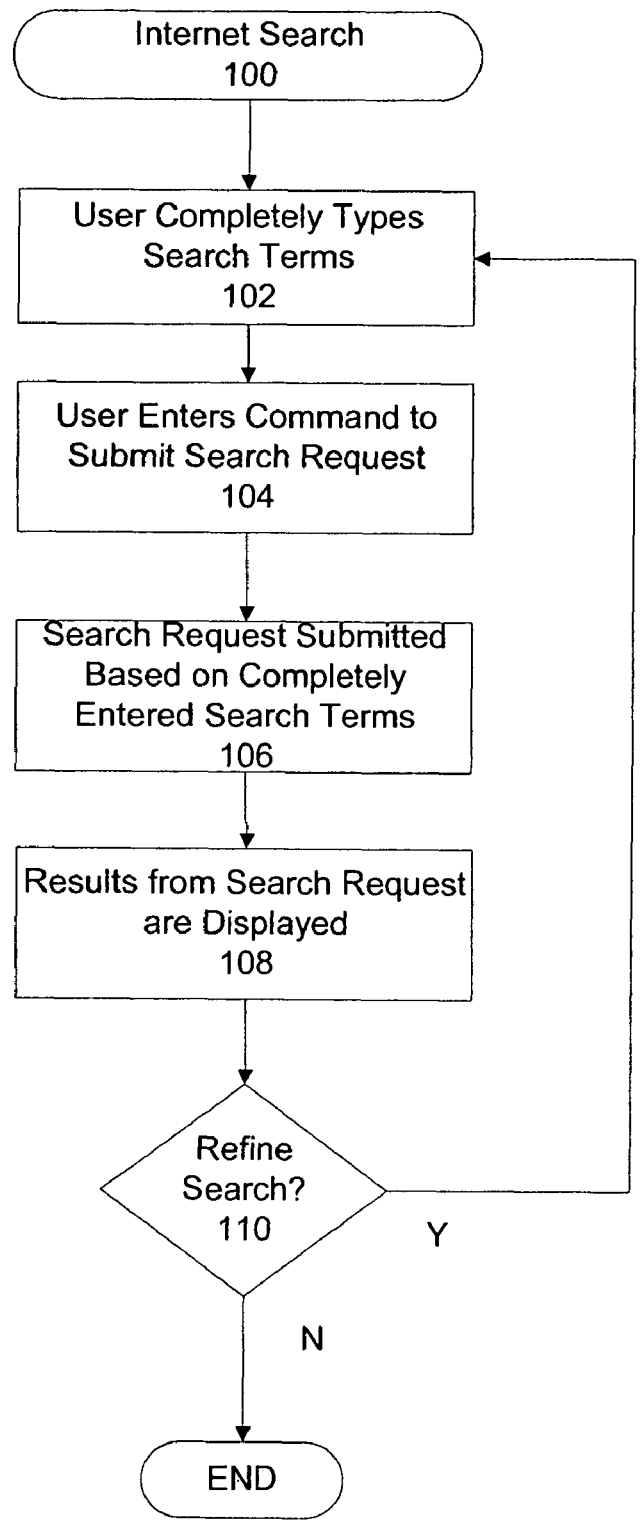
FIG. 1 illustrates a prior art method of Internet searching.
Figure 2A:
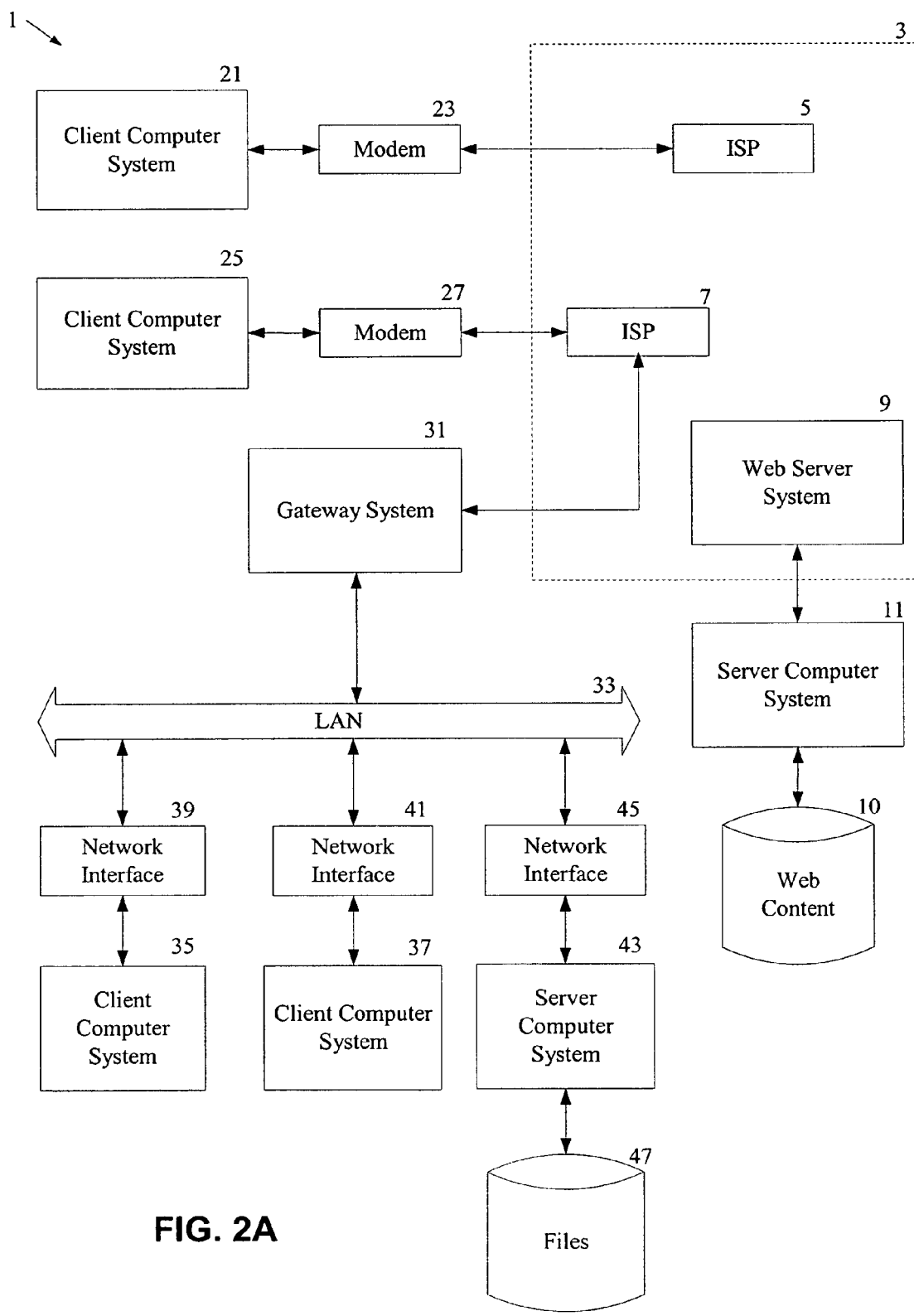
FIG. 2A illustrates an embodiment of an operating environment suitable for practicing the present invention.
Figure 2B:
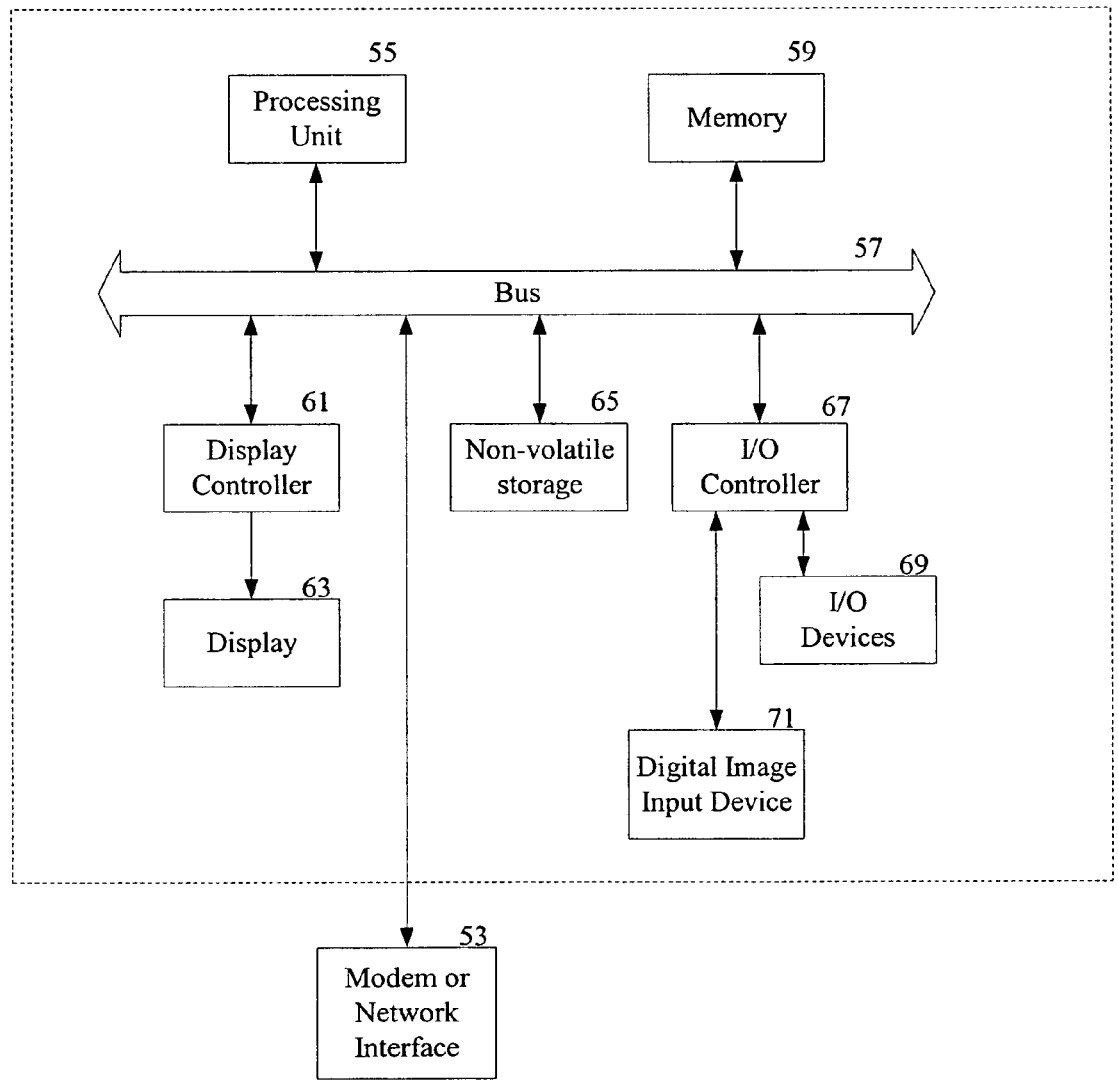
FIG. 2B illustrates an embodiment of a computer system suitable for use in the operating environment of FIG. 2A.

The following description of FIGS. 2A and 2B is intended to provide an overview of computer hardware and other operating components suitable for implementing embodiments of the invention described below, but is not intended to limit the applicable environments. One of skill in the art will immediately appreciate that the invention can be practiced with other computer system configurations, including handheld devices, cellular telephones, multiprocessor systems, microprocessor-based or programmable consumer electronics/appliances, network PCs, minicomputers, mainframe computers, and the like. Embodiments of the invention can also be practiced in distributed computing environments where tasks are performed by remote processing devices that are linked through a communications network.

FIG. 2A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send emails and instant messages, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 2A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, consumer electronics/appliance, a network computer, a Web TV system, a handheld device, or other such computer system. Similarly, the ISP 7 provides Internet connectivity for client systems 25, 35, and 37, although as shown in FIG. 2A, the connections are not the same for these three computer systems. Client computer system 25 is coupled through a modem interface 27 while client computer systems 35 and 37 are part of a LAN. While FIG. 2A shows the interfaces 23 and 27 as generically as a "modem," it will be appreciated that each of these interfaces can be an analog modem, ISDN modem, DSL modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 2B shows one example of a conventional computer system that can be used as a client computer system or a server computer system or as a web server system. The computer system of FIG. 2B may, for example, be an Apple® Macintosh® computer. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, DSL modem, cable modem, token ring interface, satellite transmission interface, or other interfaces for coupling a computer system to other computer systems. The computer system 51 includes a processing unit 55, which can be a conventional microprocessor such as a G3, G4, or G5 microprocessor from Motorola, Inc. or IBM, a Motorola Power PC microprocessor, or an Intel Pentium microprocessor. Memory 59 is coupled to the processor 55 by a bus 57. Memory 59 can be dynamic random access memory (DRAM) and can also include static RAM (SRAM), among other types of well-known memory devices. The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 2B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as the Mac OS® operating system from Apple Computer, Inc. of Cupertino, Calif., and their associated file management systems. The file management system is typically stored in the non-volatile storage 65 and causes the processor 55 to execute the various acts required by the operating system to input and output data and to store data in memory, including storing files on the non-volatile storage 65.

Figure 3:
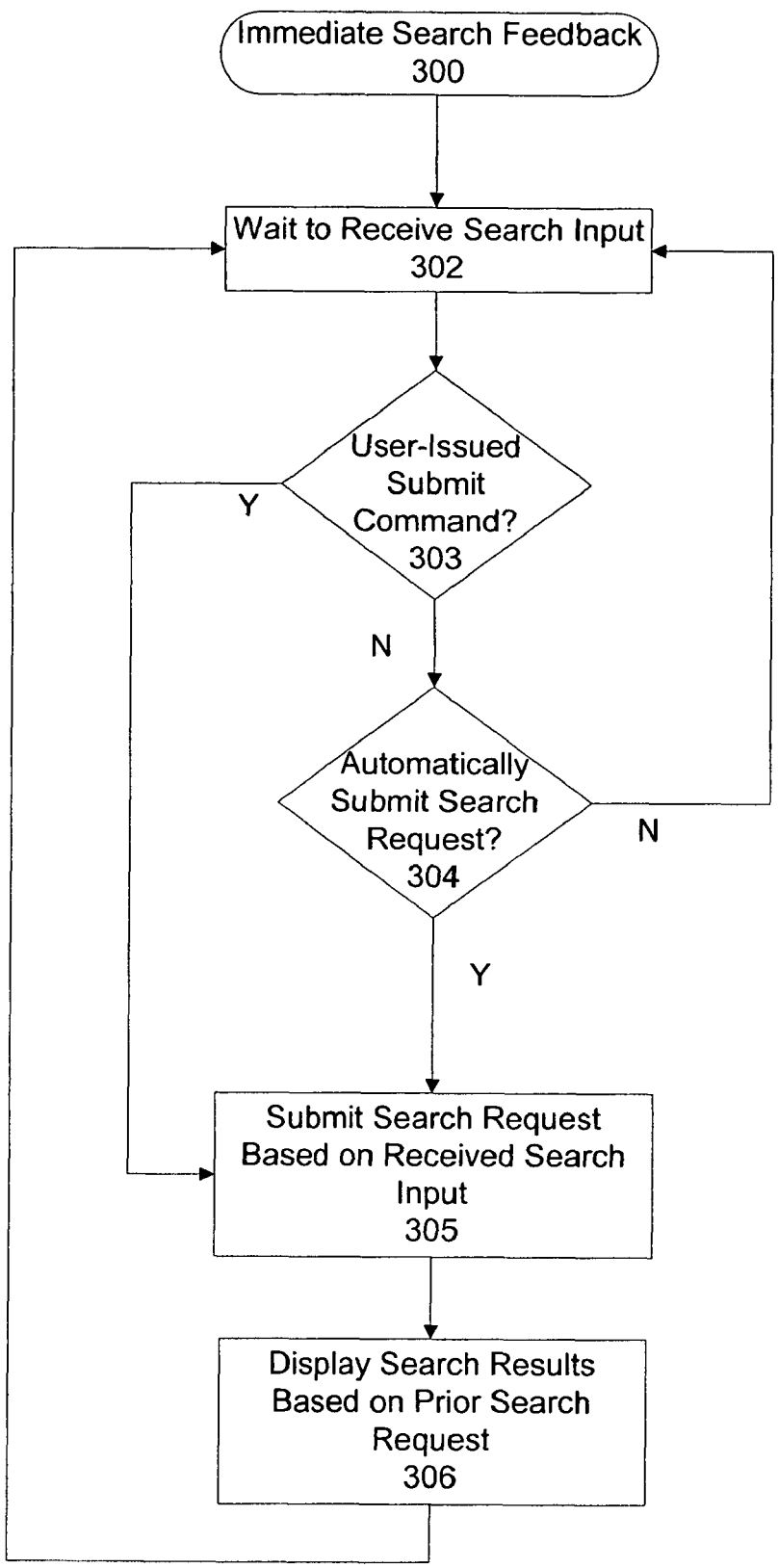
FIG. 3 illustrates an embodiment of an immediate Internet search feedback method.

FIG. 3 illustrates an embodiment of an immediate search feedback method 300. At block 302, the method 300 waits to receive search input from a user. Search input includes, for example, text (e.g. keywords or portions thereof) or other input describing the desired information sought by a user. In one embodiment, the received search input is text that is typed or otherwise entered by a user into a computer system. In one embodiment, search input is entered into a field or form that is presented as part of a graphical user interface (GUI). The field may be a field presented to the user as part of a web browser application, such as a field presented in a toolbar. In another embodiment, the search input field may be presented as part of the coding of a web page, such as for example an input field on a search engine homepage (e.g. http://www-.google.com). In one embodiment, search input includes text input by the user as part of the query, such as keywords, search terms, or parameters relating to the information sought. In one embodiment, a command used to manually submit a search (e.g. pressing "Return") using input keywords is not considered search input, since it does not describe aspects of the information sought; rather it only serves to submit a query.

As used herein, a web browser is a software application program that is used to read, display, locate, download or otherwise access documents (e.g. web pages) or other data resources on the Internet, which includes the World Wide Web. Web browsers are capable of interpreting or processing "marked up" or coded documents (typically Hypertext Markup Language (HTML)) that reside on servers and interpret the coding to render a web page. Most web browsers are graphical browsers, which are capable of displaying both text and graphics from web pages. In addition, most browsers are capable of presenting multimedia information, including sound and video. An example of a conventional web browser is the Safari™ web browser, version 1.2.4, available from Apple Computer, Inc., the assignee of the present application.

At block 303, the method 300 determines whether the user has issued a submit command. A submit command is a user-issued command that triggers a search request based on the search input received at that point in time, such as for example depressing a "Return," "Enter," or "Submit" key or button. For example, if a user types in three characters, then presses the "Return" key on their keyboard or clicks a "Submit" button in their web browser application (block 303), a search request is submitted (block 305) to the search engine using the three characters typed in. This may be considered a manual search, since the search request only occurred in response to an express user command to submit the search request.

Another type of user-issued or manual submit command is the manual selection of a suggested search term or phrase, such as that presented by auto-complete or auto-correction features of a software application. For example, in one embodiment, upon typing a few characters of search input, an auto-complete feature of a software application may present the user with one or more suggested terms in an attempt to anticipate what the user may be trying to type, based on the characters already input by the user. For example, if a user types in part of a keyword in the search field, the browser automatically completes the rest of the keyword for the user according to previously input keywords. To perform a search query on one of the suggested terms, the user may select (e.g. using a pointing device to click on) one of the terms. The auto-complete suggestions may come from a standard dictionary of words, or may be personalized based on words or phrases previously input by the user. In another embodiment, an auto-correct feature suggests correctly spelled search terms when a user appears to have typed a misspelled word.

If a user-issued submit command is not received at block 303, the method 300 continues to block 304. At block 304, the method 300 determines whether to automatically process a search request or query using the search input that has been received up to that point in time. In one embodiment, the determination at block 304 is made as a user is typing or entering the search input. In one embodiment, the determination is whether enough search input and associated information has been received such that a search request should be automatically processed using the search input that has been received. The determination may be based on the cumulative search input received (e.g. text characters) at the time of the determination, as well as other characteristics of the search input (e.g. pauses while typing). Embodiments of the processing represented by block 304 are described in greater detail below with respect to FIG. 4.

If the method 300 determines at block 304 that a search request should not be automatically processed at that time, the method 300 returns to block 302 to wait for receiving additional search input or other input characteristics (e.g. a sustained period without further text input).

If a determination is made at block 304 that a search request should be automatically submitted, the method 300 submits a search request at block 305 based on the cumulative search input received up to that point in time. For example, if at the time the determination is made to automatically process a search request, a user had input a three characters into a search field at block 302, the method 300 would automatically submit a search request using a query string including the three characters. By automatically submitting a search request, it is meant that the user is not necessarily required to issue an express command to submit the search request, such as by pressing an "Return" key or clicking a "Submit" button; rather, the method 300 is capable of automatically submitting a search request (using the received search input) while a user continues to input their desired search terms. Thus, a search may be performed before the user has completely input their desired search terms, and in one embodiment, while a user is actively inputting search terms. The end result to the user is that substantially immediate search feedback (i.e. search results) is provided as a user inputs their search terms.

At block 306, the method 300 displays search results returned based on the prior search request submitted at block 305. In one embodiment, the results are presented as part of a web page. The method 300 then returns to block 302 to wait to receive additional (or revised) search input. In one embodiment, if further search results are submitted, results associated with these requests replace the previously displayed results.

Thus, in one embodiment, as a user enters additional search input, the displayed results are gradually updated to reflect the cumulative search input received, without the user being required to issue an express submit command to the search engine. Incremental search feedback is provided through the presentation of results based on partial query strings as search terms continue to be input. This "search as-you-type" aspect allows a user to be presented with search results before the user has necessarily completed their intended search input, which may result in the user finding their desired result(s) more quickly than they would have otherwise (e.g. if they had to enter a complete query and then manually submit the search request). Furthermore, in one embodiment, as a user is presented with incremental search results, they can revise their search terms if needed to receive more relevant results, or they may even continue adding search terms to further refine their query.

Since the results are automatically updated to reflect the recent queries, the user may consider whether to modify the search terms input. For example, many typical results web pages include excerpts (or "snippets") of text from the respective web pages linked to by each of the results, often showing the queried terms in boldface. These excerpts also present the user with the context in which the queried search terms appear on the web page. In the course of viewing these excerpts from the results, the user may often see additional terms or keywords that may be more relevant for their desired search. The user may then simply add on these terms to their query by continuing to type these terms into the search field. This incremental and iterative process may quickly lead a user to their desired results. As a user adds additional search terms, the results may become more and more specific, with the most relevant search results eventually appearing in the results page. The presentation of intermediate results to the user during the input of the terms may have a synergistic effect on the user's entire search experience, since the query input by the user may be influenced by the intermediate results, leading to more specific queries and thus assisting the user to find their desired results more quickly and efficiently.

In one embodiment, if additional search input is received while there is a pending or in-progress search request (i.e. the results for a submitted search request have not yet been received), the pending search request may be cancelled and replaced by a new search request including the additional received search input. Thus, in one embodiment, this may conserve bandwidth by prioritizing more complete or more recent input from the user, and using this more complete or more recent input to perform searches.

In another embodiment, search input may include non-textual input from a user as part of the search, such as selected checkboxes, radio buttons, or other graphical elements selected by the user to specify parameters of the search. Search parameters may include, for example, options for limiting the number of displayed results, limiting the date range of results, limiting the file format of the results, the language of the results, the domain of the results, whether the terms are exactly matched in the results, whether all terms entered must be in the results, among other common search parameters. For example, in one embodiment, indicating a search parameter may trigger an automatic search.

In yet another embodiment, search input may include audio input from a user, such as spoken words from a user. For example, a speech recognition software application or module may convert words spoken by a user into text which is input into the search input field or otherwise submitted as part of the search request. Such features may be combined with various aspects of the embodiments describe above. For example, as a user speaks each additional word, a new search query is issued incorporating the additional word in submitted the query string.

Figure 4:
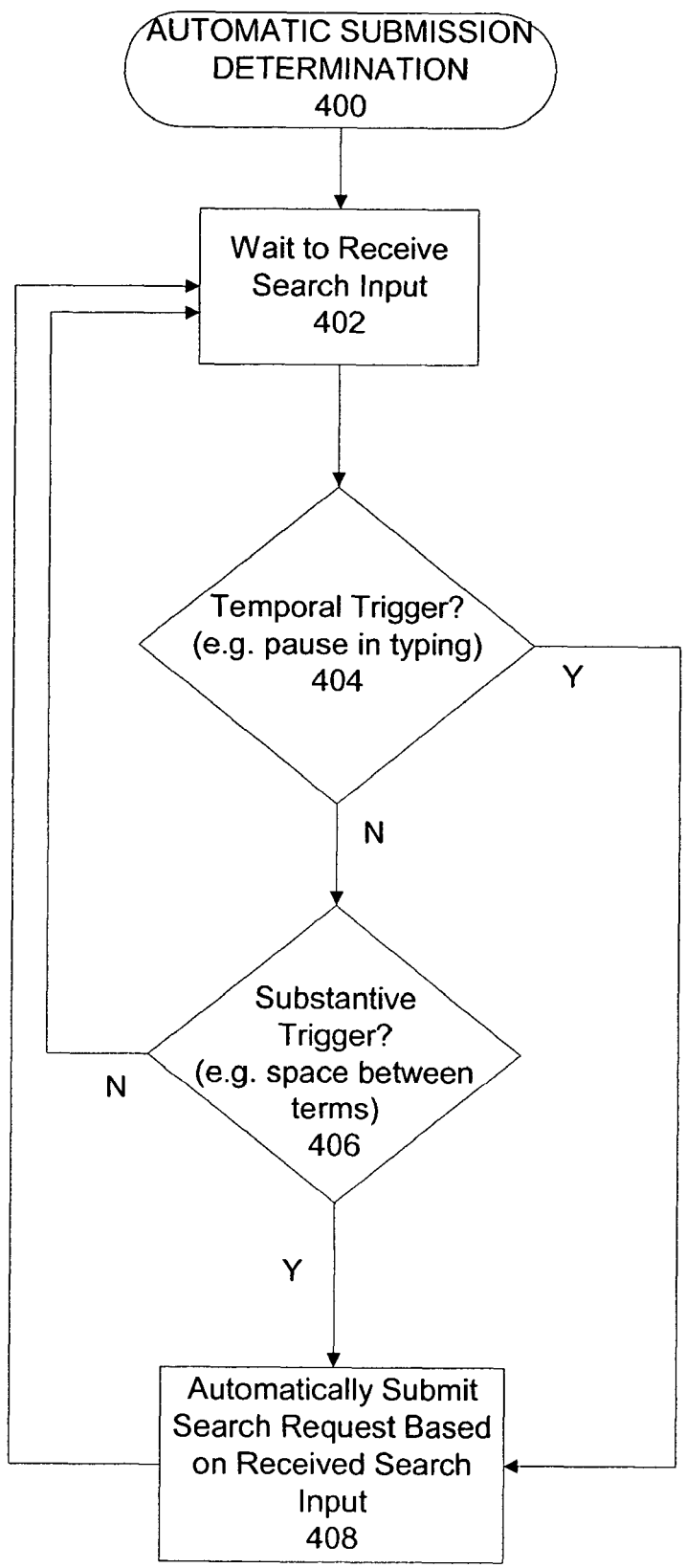
FIG. 4 illustrates an embodiment of an automatic submission determination method.

FIG. 4 illustrates an embodiment of an automatic submission determination method 400. In one embodiment, method 400 represents the processing of block 304 in FIG. 3, described above. At block 402, the method 400 waits for search input to be received. Once search input is received, the method 400 begins analyzing the received search input to determine whether or not to automatically submit a search request using the search input that has been received. The analysis may include several factors, and those described below are understood not to be exhaustive or limiting. The analysis may include various characteristics of the search input, such as what characters were typed, pauses while typing, or lack of input (e.g. an extended period without further input).

At block 404, the method 400 determines whether temporal characteristics of the received search input satisfy a time-based trigger. In one embodiment, a time-based trigger refers to a characteristic of the user's search input pattern having to do with time (i.e. temporal), such as the speed at which the user types in search input, including for example, pauses while typing search input, or the elapsed time period after the last character was typed or input without having received further input (i.e. delay). For example, a user may naturally momentarily pause while typing search terms, either in the middle of a search term, or between terms. In one embodiment, use of a time based trigger is advantageous for conserving network resources (i.e. bandwidth, processing, etc.), as the time trigger may be used to avoid performing a search after each individual character is typed even where a user types relatively quickly, which may slow down the user interaction and unnecessarily consume bandwidth. In one embodiment, a pause while inputting search terms serves as a trigger or cue for the method 400 to initiate an automatic search request at block 408 using the search input that has been received up to the user's pause. If a time-based trigger has not been met at block 404, the method 400 continues its analysis of the search input at block 406.

In one embodiment, a time threshold or heuristic is associated with the time-based trigger. For example, in one embodiment, the time threshold is about 1 second. Thus, in such an embodiment, when a user pauses momentarily for at least 1 second after typing search input (i.e. after last receiving input, no further input is received for 1 second), the method 400 will automatically submit a search request using the received input at that point. In another embodiment, a time threshold may be a fraction of a second, such as 1/10 of a second. It will be appreciated that longer or shorter predetermined time thresholds may be used. In one embodiment, the time threshold may be set or adjusted manually by the user. For example, an embodiment of a user interface for setting or adjusting the time threshold, and other characteristics for immediate search feedback, is discussed below with reference to FIG. 7. In another embodiment, the time threshold is set by a learning algorithm based on a particular user's typing characteristics, as may be gained from past search input by the user. For example, in a training mode for a particular user, the algorithm may time the average delay or pause between successive input characters when a user interacts with the search field. Alternatively, in one embodiment, the learning algorithm may record the average pause/delay between characters in other software applications used on the computing device, such as a word processing application. Once an average pause/delay has been determined based on a suitable number of observed samples, the time threshold may be set to this average time. In one embodiment, the average pause/delay used to set the time threshold may change over time based on the input characteristics of the user. Furthermore, in one embodiment, different time thresholds may be associated with particular users, based on their own respective typing habits. In yet another embodiment, the duration of the time threshold used for triggering an automatic submission is substantially the same as other time thresholds used in other applications of a particular user's computing system.

At block 406, the method 400 analyzes the substantive characteristics of the search input for a substantive trigger. In one embodiment, the substantive characteristics of the search input include characteristics of the individual characters input by the user (e.g. what was the last character input), as well as the cumulative search input of the user (e.g. the entire string of search input). Substantive characteristics of the search input that may be analyzed by the method 400 may include length (number of characters), semantics, syntax, grammatical, numerical, linguistic and other characteristics of the content of the search input. In one embodiment, a substantive trigger may be met by a substantive characteristic of the search input that, when identified by the method 400, causes the method 400 to automatically submit a search request based on search input received from the user at that point. When a substantive trigger is met or satisfied by the received search input at block 406, the method 400 automatically submits a search request based on the received search input at block 408. If a substantive trigger is not satisfied by the received search input at block 406, the method 400 returns to block 402 to wait to receive additional search input.

In one embodiment, a substantive trigger may be satisfied by grammatical, numerical, or character-based characteristics of the search input. For example, in one embodiment, when a user types a space between search terms, a substantive trigger is met, since a space typically indicates the completion of a search term. In one embodiment, when a substantive trigger is met, the method 400 automatically submits at block 408 a search request using the search input received up to the time the substantive trigger was met. The search request may consist of the exact input entered at the time of the automatic submission, e.g. if the automatic submission is triggered after the user had typed cat, then the query may simply include cat. In another embodiment, the method 400 may add a wildcard to the received input (e.g. cat* or cat?) to extend the search, by querying for multiple matching terms to be returned based on a shared characteristic (e.g. the first three letters being cat). Examples of two common wildcard symbols are the question mark (?), which stands for any single character, and the asterisk (*), which stands for any character string of any length. In another embodiment, when input triggers an automatic search submission, the method 400 may search for synonyms of words used in the query. In another embodiment, when input triggers an automatic search submission, the method 400 may use stemming to expand the scope of the submitted query. Stemming involves using linguistic analysis to reduce a search term (or word) to its root form, and then matching all forms of a word in a search query to all forms of the same word. For example, search input including the word active might also return documents containing the words actively, activate, proactive, and activity.

It will be appreciated that aspects for expanding the search results for a given search input may be implemented by the search engine to which the query is submitted. It will also be appreciated that in another embodiment, the exact characters that trigger the automatic submission are submitted to the search engine as a query, and then additional processing to expand the scope of returned results may be implemented on the server side of the search engine. For example, where cat triggers an automatic submission by a client browser application, the query submitted to the search engine site by the client may only consist of cat, but the server-side of the search engine will perform local processing of the query to expand the query to include, e.g. cat* or other derivatives of the partial search string.

In one embodiment, an auto-complete feature may be used in conjunction with the automatic submission of queries. For example, where a user has partially typed a search term, an auto-complete feature may automatically complete the partial search term with letters from a matching term used previously, and then automatically submit a query using the complete search term, without requiring an express submit command from the user. Thus, results for a complete search may be presented to a user automatically. As described above, the auto-complete terms may come from a standard dictionary of words, or may be personalized based on words or phrases previously input by the user.

In one embodiment, as a user types characters of a search term, the input may be compared to a dictionary of known complete words, and if there is a match (e.g. the cumulative input characters match a portion of the letters for a known word), then a query is automatically submitted using the auto-completed word. For example, as a user is typing in the term groundhog, after the user has typed groundh, a corresponding complete term "groundhog" may be matched from a dictionary (since the first letters match) as a predicted complete search term, after which a query is automatically submitted using groundhog. Thus, even though the user may have only typed groundh, results from a query using groundhog may appear automatically. In another embodiment, the auto-complete may use an algorithm to predict next characters or words based on the frequency with which certain letters or word combinations are used. This may be used to automatically submit queries in which the received input from the user is supplemented with anticipated search terms or characters, the results of which are automatically presented to the user.

Some search engines, such as the Google™ search engine, include spell checking software that automatically analyzes a submitted query and checks to see if the query uses the most common version of a word's spelling. If it is calculated that more relevant search results will be generated with an alternative spelling of a submitted keyword or search term, results pages returned by the Google™ search engine will suggest a more common spelling (e.g. by presenting a hyperlink to a search for the more common spelling, such as "Did you mean: (more common spelling)?". Clicking on the suggested spelling will launch a search for that term. In one embodiment, the spell checking features of a search engine, such as the Google™ search engine, may be leveraged to automatically revise submitted queries. In one embodiment, where a user inputs text into a search field having the immediate search feedback functionality, the browser application determines whether the results page returned by the search engine includes a suggestion by the search engine for an alternate spelling of a submitted search term, and if so, automatically submits a subsequent search using the suggested spelling of the term. In another embodiment, rather than automatically submitting the search term, the browser presents the user with a suggestion for the corrected spelling, such as through an auto-complete feature.

There are numerous types of substantive triggers contemplated. In various embodiments, a substantive trigger may include punctuation, such as a period, comma, question mark, exclamation mark, colon, semicolon, hyphen, dash, parentheses, bracket, ellipsis, apostrophe, accent mark, quotation mark, etc. In other embodiments, a substantive trigger may include a slash, ampersand, asterisk, underscore or other non-alphanumeric characters, in addition to special characters or operators. In various other embodiments, a substantive trigger may include mathematical symbols, such as a plus sign or a minus sign, as well as Boolean operators, etc. In another embodiment, a substantive trigger may include complete words. For example, as a user types their search input, the method 400 determines if the cumulative received input matches an entry in a dictionary of words (i.e. the input characters form a known word), a search query may be automatically submitted using the input received up to that point. This may result, for example, in an automatic submission of a term without the user inputting a space character; i.e. the search is submitted as soon as the cumulative received input recognized as constituting a known word. Furthermore, in one embodiment, conjunctions or other grammatical constructs may be used as substantive triggers. In still yet other embodiments, a substantive trigger may include nouns, verbs, adjectives or adverbs. Furthermore, in other embodiments, specific characters (e.g. vowels, or specific letters, such as letters which occur with high frequency, like r, s, t, l, n and/or e) may be set as substantive triggers.

In one embodiment, a substantive trigger may be met when a threshold number of characters are input. For example, in one embodiment, a substantive trigger is met when three characters are input, and thus a search will automatically be submitted after three characters are input. In another embodiment, capitalization may be a substantive trigger. In yet another embodiment, a syllable or other standardized subdivision of a word may serve as a substantive trigger.

It will be appreciated that one or more temporal or substantive triggers may be used together in combination. For example, in one embodiment, a temporal trigger may be longer (e.g. 2 seconds) if two characters have been typed, as compared to a shorter temporal trigger (e.g. $\frac{1}{10}$ second) after six characters have been typed.

In one embodiment, the automatic submission determination method 400 analyzes received search input to determine if an automatic search request should be delayed, i.e. whether the method 400 should wait for additional search input before automatically submitting a search request. For example, in one embodiment, where a user desires to search for a specific phrase, the user may begin the search input by typing a quotation mark prior to the phrase. Since by typing a quotation mark, the user indicates that he/she desires only results having a specific phrase, the method 400 will determine that an automatic search request should be delayed until, for example, a subsequent corresponding close quotation mark is entered by the user, indicating completion of the desired search phrase. In addition to a quotation mark, other punctuation or operators, such as for example a wildcard (e.g. a character such as *, $, or ?, that can be used to represent any other character or series of characters in a query) or a + symbol (e.g. to require the subsequent search term to be present in a returned result) may be substantive triggers.

Furthermore, in one embodiment of the automatic submission determination method 400, the various temporal or substantive triggers or thresholds may be varied depending on the speed of the user's connection to the search engine. For example, where a user's computing device is connected to the Internet via a relatively high speed connection (e.g. a Digital Subscriber Line (DSL) having a download speed of about 1.5 megabits per second and an upload speed of about 128 kilobits per second), the method may automatically submit a query after 1 second without further input, whereas the method would wait 3 seconds if the connection speed was relatively slower (e.g. a modem connection having a speed of about 56 kilobits per second).

In another embodiment, the immediate search feedback method may be tuned to perform well on both computing devices having relatively slow network connection speeds as well as those having relatively fast connection speeds. For example, in one embodiment, on a computing device having a relatively slow network connection (e.g. 56 kilobits per second), a user still receives search results while typing, but due to the latency of responses to automatically submitted queries, fewer "intermediate" results pages are presented to the user as the user types (e.g. due to those queries for which results are pending being cancelled/superceded by the submission of more recent queries). This has the effect of minimizing the amount of refreshing/reloading of the search results web page, which may potentially be distracting to the user if it occurs frequently. It also has the effect that the search results based on the partial queries are displayed for a longer sustained period (without being refreshed or updated), which may provide the user a greater opportunity to refine their query based on the intermediate results. On the other hand, users having relatively higher connection speeds (e.g. a DSL connection), may experience the advantage of seemingly instantaneous feedback as they type in their search terms, due to the low latency of their connection. Of course, it will be appreciated that the frequency with which result pages are refreshed/reloaded with more recent results may be adjusted or controlled, regardless of the connection speed. For example, in one embodiment, the returned results may be refreshed or reloaded no more than once every two seconds.

Figure 5A:
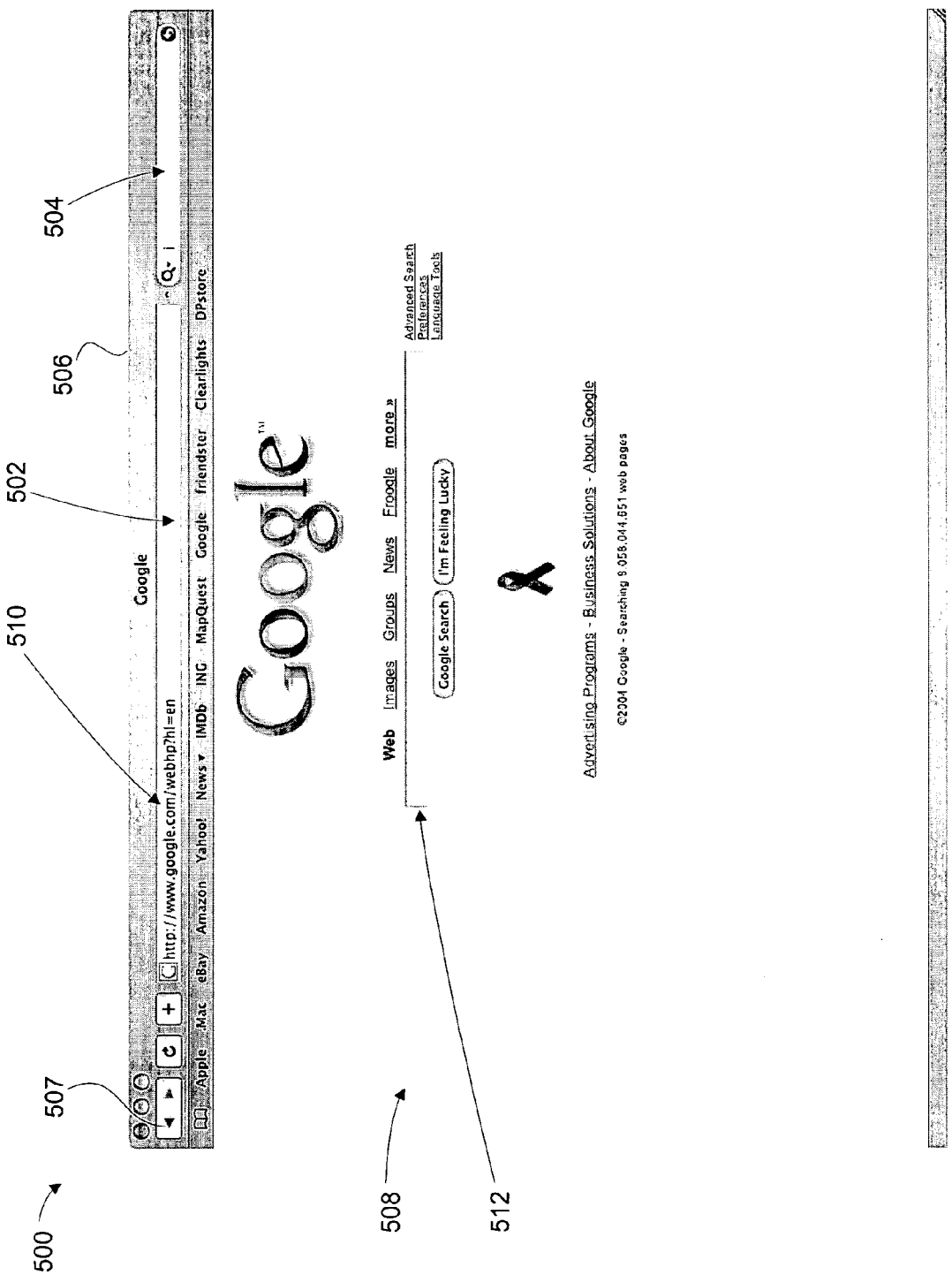
FIGS. 5A-5E illustrate embodiments of a graphical user interface (GUI) for a web browser application used to implement immediate search feedback.

FIGS. 5A-5E illustrate embodiments of an ordered sequence of screenshots during the use of a web browser application that is capable of providing immediate search feedback, such as the methods described above with respect to FIGS. 3 and 4. FIG. 5A illustrates an embodiment of a graphical user interface (GUI) for a web browser application used to implement immediate search feedback. The GUI includes a web browser window 500. The browser window 500 includes a tool bar 506, which includes GUI elements such as buttons (e.g. back button 507) and fields (e.g. search field 504). The tool bar 506 includes an address bar 502, which shows the address or uniform resource locator (URL) 510, of a displayed web page 508. The content displayed on the web page 508 depends on the URL accessed. The address bar 502 may also be used to enter the URL 510 of a web page in order to display the web page 508. In the embodiment illustrated in FIG. 5A, the URL 510 in its entirety is http://www.google.com/webhp?hl=en. In one embodiment, the tool bar 506 also includes a search field 504 for receiving search input from a user, such as text describing information sought (e.g. keywords). For example, search terms input into search field 504 are submitted as queries to a search engine, such as that accessible at www.google.com. For purposes of explanation, the embodiments illustrated with respect to FIGS. 5A-5E utilize the Google™ search engine, accessible on the Internet at http://www.google.com. It will be appreciated, of course, that other search engines may be used with embodiments of the present invention. Furthermore, embodiments of the present invention may be applied to search engines for searching data resources other than documents accessible on the Internet. For example, in addition to searching the Internet, the immediate search feedback feature may be applied to searching an intranet, a file system on a local hard drive, or even databases for media files, such as music, images, movies and others.

In one embodiment, by way of example, consider a user seeking information on the iPod® mobile digital device, available from Apple Computer, Inc. In such an example, a likely initial search term the user may use is ipod. A user may initiate a search by sequentially typing the text of the desired search term into the search field 504. In the embodiment illustrated in FIG. 5A, the letter i is shown as having been input into the search field 504 as the user begins to sequentially type the constituent letters of the search term "ipod". Conventionally, input entered into the search field is not submitted to a search engine as part of a search query until the user issues an express submit command, such as by pressing a "Return" button on a keyboard. According to one embodiment of the present invention, a search query may be submitted automatically while a user inputs the search terms into a search field. Thus, in one embodiment, upon receiving the input of the first character (e.g. "i") into the search field 504, the web browser application automatically submits a query to the search engine (e.g. www.google.com) using the as-of-then received input from the search field 504. Thus, referring to FIG. 5B, the address bar 502 includes the URL 510 containing the query submitted, http://www.google.com/search?q=i&ie=UTF-8&oe=UTF-8, wherein the i immediately following "search?q=" represents the i character typed into the search field 504. The results from the submitted query based on the text input into search field 504 of FIG. 5A are displayed in the web page 508 of results shown in FIG. 5B.

Figure 5B:
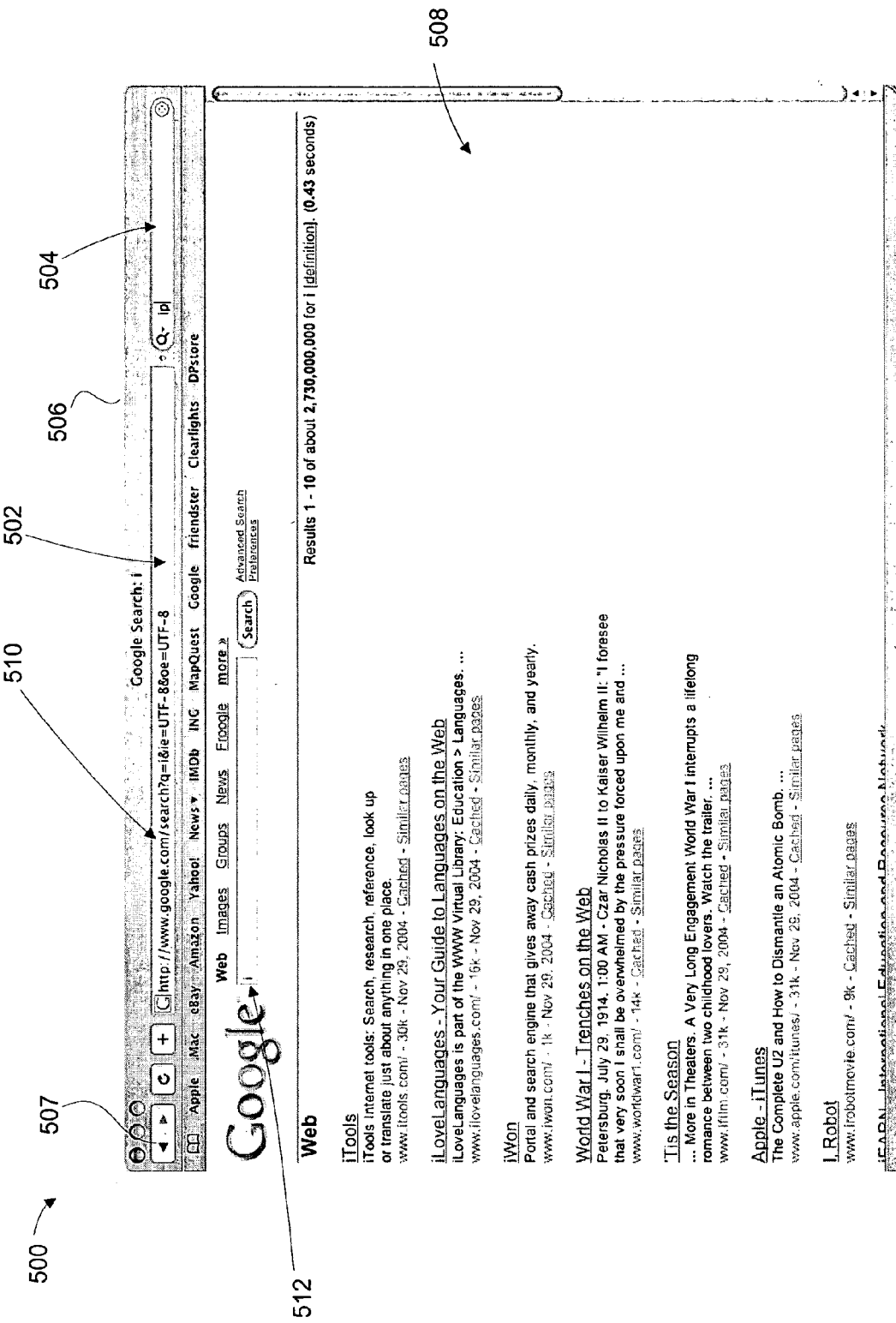
Figure 5C:
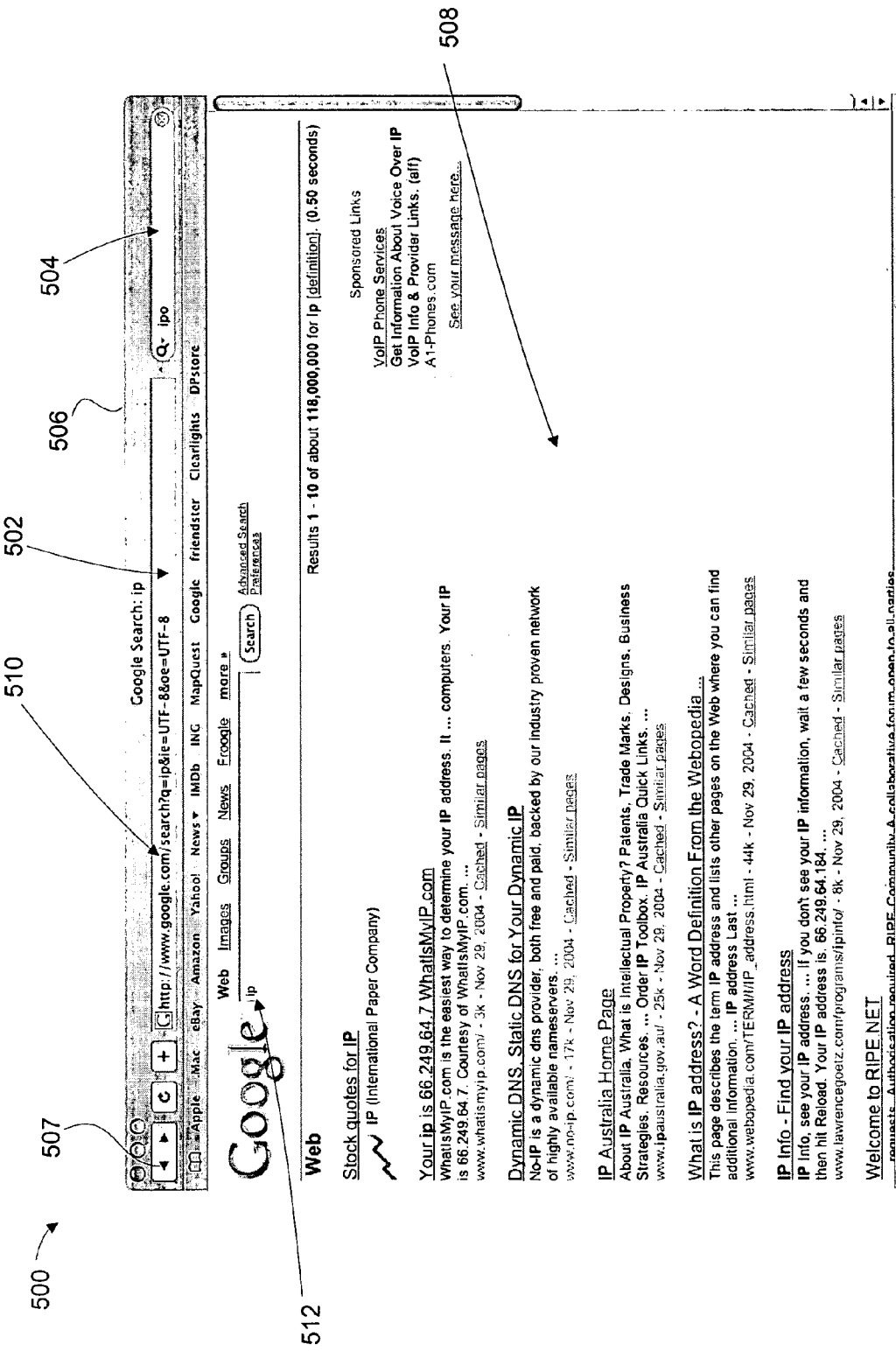
Figure 5D:
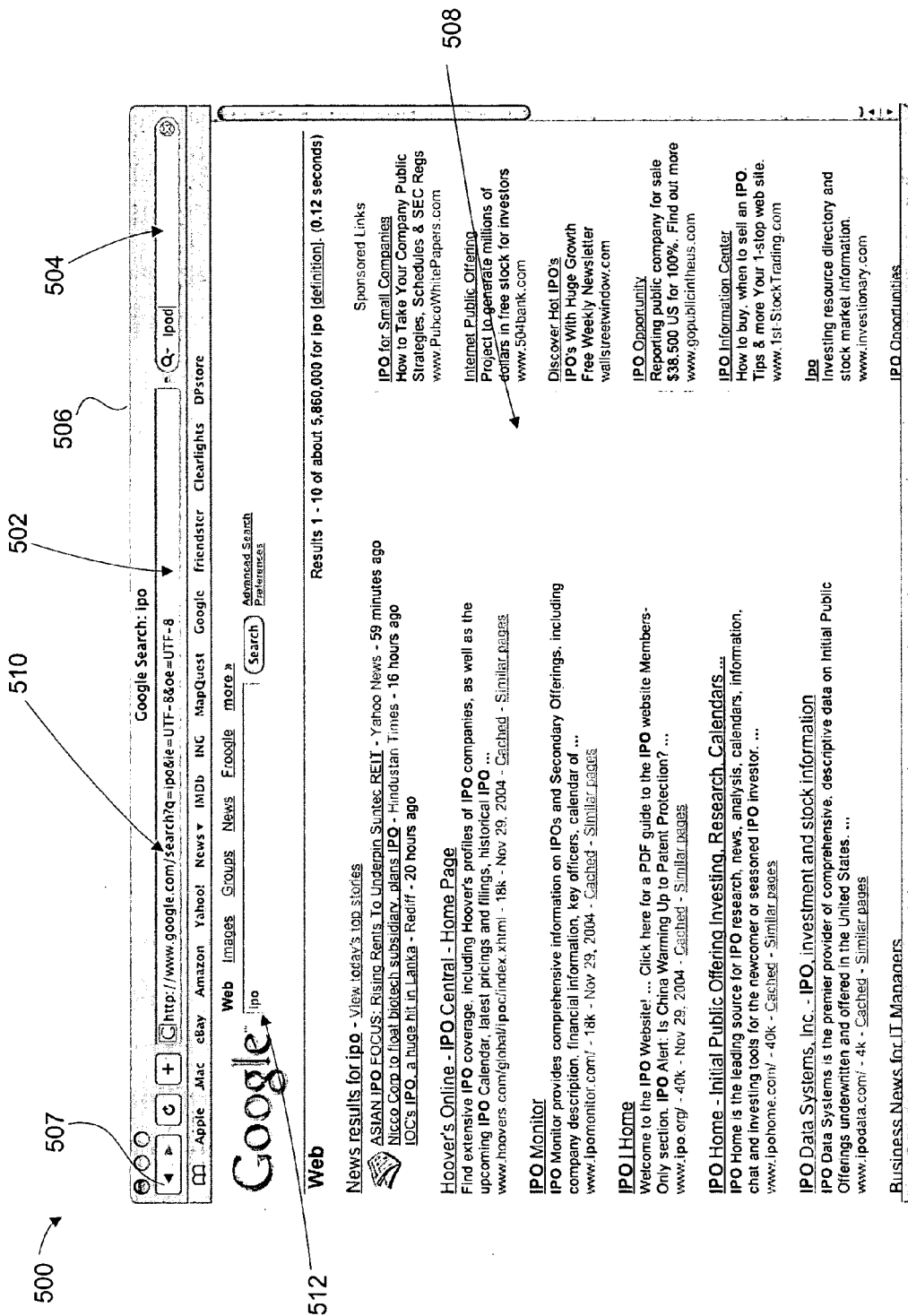
Figure 5E:
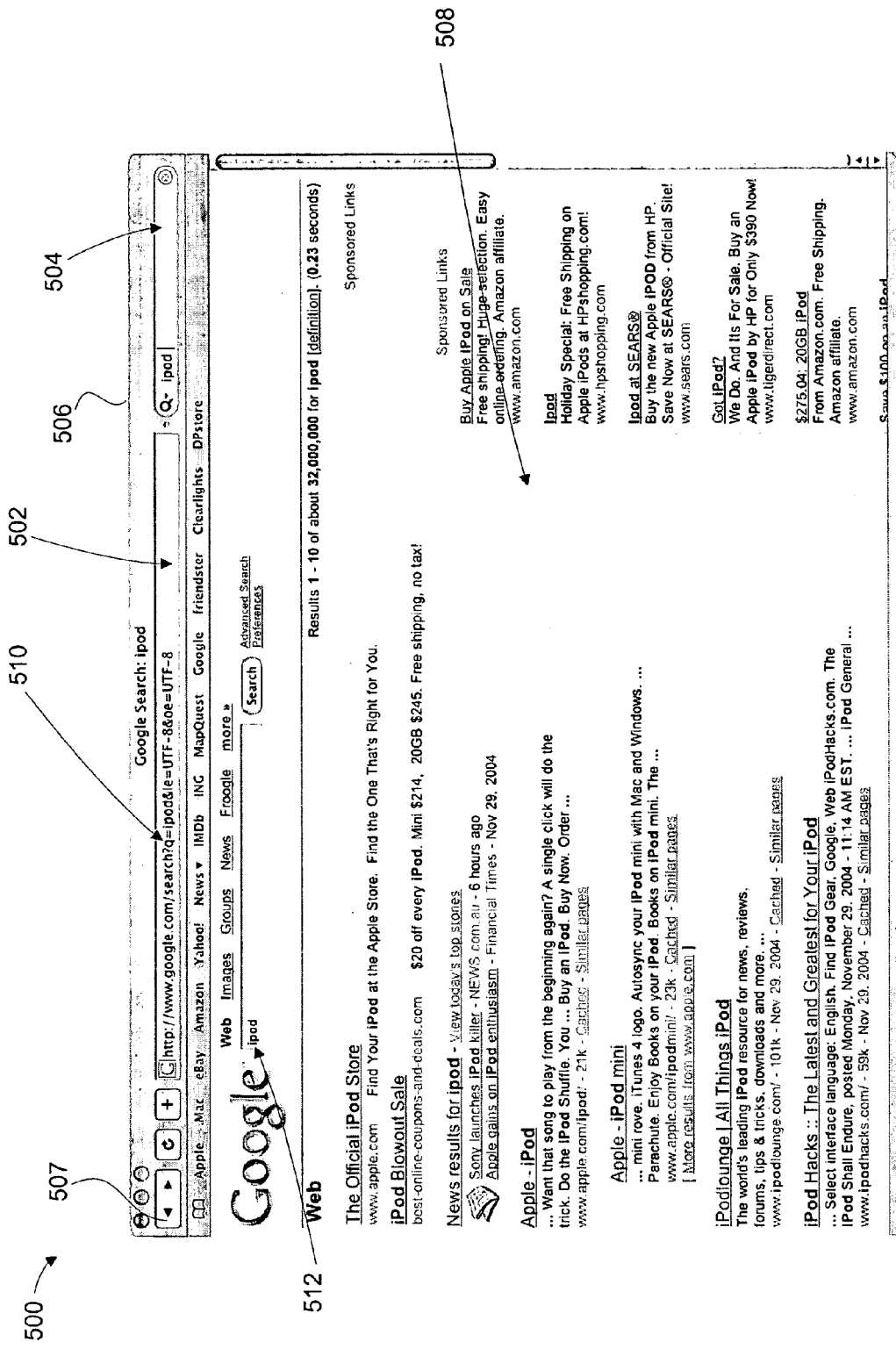

Thus, as a user types the characters of the search term(s), partial search strings are sent to the search engine at designated intervals or as certain triggers are satisfied. By "partial," it is meant that the query only includes the as-yet-received input of the search term; the search string itself is otherwise complete enough to be in a format which will allow it to be appropriately processed by the search engine. Referring to search field 504 of FIG. 5B, the user continues to type the desired search input by typing the next character, p, of the search term, ipod. Upon receiving this next character of the search term, the web browser application automatically submits another query to the search engine, incorporating the additional input. Thus, referring to FIG. 5C, a web page 508 of results for a query based on the input characters, ip, are displayed. These new results for the "ip" query update or replace the results from the previous "i" query. In this manner, immediate feedback in the form of dynamic or "real time" results are provided while a user is in the process of entering their desired search term. The address bar 502 is updated to reflect the URL 510 associated with the query which elicited the displayed responses, e.g. http://www.google.com/search?q=ip&ie=UTF-8&oe=UTF-8. Search field 504 of FIG. 5C illustrates that the user continues to input the search term by inputting the next character, o. Again, a new query including the cumulative input received in the search field 504 (e.g. ipo) is automatically submitted upon receiving input of the o character. Results 508 for this query are subsequently automatically displayed after receiving them from the search engine, as illustrated in FIG. 5D. Likewise, as the user enters the final character of the search term, d, into the search field 504 of FIG. 5D, a new query is submitted to the search engine incorporating the entire search term, ipod, and the corresponding received results 508 are displayed as illustrated in FIG. 5E.

Thus, referring collectively to the embodiments illustrated by FIGS. 5A-5E, as a user inputs a search term, partial search strings are incrementally automatically submitted to the search engine, which causes results for each of the partial queries to be automatically displayed and updated as the user types, without requiring the user to issue an express submit command. One advantage of this is that, while typing a search term, a user may see a desired result in the web page 508 before the user has completely typed in their intended search terms; the user may select this result (e.g. by clicking on its hyperlink), thereby allowing the user to access desired information more quickly than they might have otherwise, e.g. if they had been required to completely enter their search term (s) and manually submit the query. Additionally, the immediate search feedback provided by the "live" or dynamic updating of the search results, based on returned results for the most recently automatically submitted query, allows a user to modify a query before they have completely input their intended query. For example, this is particularly useful if a user misspells a search term, since the user may notice as they type that the results are not what was expected, and may accordingly modify their search terms.

It should be noted that for purposes of clarity, FIGS. 5A-5E and their corresponding description illustrate embodiments in which a search query is automatically submitted after receiving each additional character of text input (i.e. a type of substantive trigger); it will be appreciated that use of other triggers for automatically submitting a search, such as those described above with respect to FIG. 4, are contemplated.

Referring again to FIGS. 5A and 5B, in one embodiment, the immediate search feedback aspect of the present invention may be implemented through a search field 512 presented within a web page itself, as opposed to a search field 504 that is integrated into the toolbar 506 of a web browser application window 500. For example, a user may visit a web page and begin to type search terms into a search field 512 presented on the web page 508. As the user types the characters of the search terms, partial search strings are generated and submitted to a search engine. The results corresponding to these partial queries may be presented, such as is illustrated in FIG. 5B. In one embodiment, the web page-based search field 512 may be implemented alone or in combination with the integrated search field 504. In one embodiment, a web page based search field having immediate search feedback capabilities may be implemented through a self-submitting form on a web site, using for example JavaScript that detects input on a field, and then periodically submits a new query string, causing the page to be reloaded displaying the results of the new query string. Such a form may be used to automatically submit the partial search strings at specific intervals or upon the satisfaction of certain triggers, as described above with respect to FIG. 4. In one embodiment, application code implemented on the server-side of the web page may generate the partial search strings and their immediate search feedback results. In another embodiment, a search field having immediate search feedback capabilities may be positioned in a first frame of a web page, while results based on queries generated from the input into the search field are displayed in a second frame of the web page. A frame is typically a subsection of a web page that is displayed independently of other portions of the page. For example, as a user types search terms into the field of the first frame, the second frame of the web page is reloaded to display returned results for each automatically submitted search.

In one embodiment, where a search field 512 is presented as part of a web page 508, the search engine to which the partial strings are automatically submitted does not necessarily have to be associated with the same domain as that of the URL of the web page 508. For example, if a search field 512 is presented on a web page accessible at www.google.com, the input entered into the search field 512 may be used to automatically create partial search strings submitted to a search engine located at www.example.com.

Some web pages include script (e.g. JavaScript) to automatically place focus on a designated text input field on the web page as soon the web page is loaded. The "focus" refers to an onscreen element (e.g. a text input field) to which user-generated input (e.g. keyboard input) is directed. For example, if a text input field has focus (or is focused), the text input field will react when the user next types text input; i.e. the typed characters will be inserted into the text field. Directing the focus is often implemented to allow a user to directly input text into a form field, without having to direct a mouse cursor to the field. In certain embodiments of the present invention, since a user may be presented with a web page of results as the user continues to type search terms into a search field, it is important to maintain focus within the designated search field, despite contradictory commands that may be received from a web page that is loaded. For example, it may interfere with or slow down a user's interaction if each time a results page is loaded the user is required to manually redirect the focus from a form on the web page back to the browser application's integrated search field (e.g. field 504 of FIG. 5A). As such, in one embodiment, the present invention automatically maintains focus on the integrated search field 504 by preventing a web page from redirecting the focus from the desired search field 504, until the user manually redirects the focus, for example by clicking the mouse cursor onto some other field or object.

In one embodiment, maintaining focus on the search field 504 despite commands received from a retrieved web page may be limited only to the search engine results web page itself, to avoid interference with the operation of substantive, non-search results pages, such as individual pages referenced by the search results page. For example, in the context of using the Google™ search engine, in one embodiment, the browser application may prevent focus from being redirected from the search field 504 while conducting searches on http://www.google.com; however, once the user selects a returned search result, or visits a page other than http://www.google.com (e.g. a non-search engine page), control of the focus reverts back to the visited web page, thereby preserving the function of any focus-control script on the visited (non-search engine) page. In another embodiment, if a web page, including a search page such as that located at http://www.google.com, directs the focus to a field in the page (e.g. field 512), the browser application may momentarily permit this redirection of the focus from the search field 504; however, once the focus is redirected from the search field 504, if the user does not interact with the targeted web page field (e.g. by inputting text) within a specified period of time (e.g. ten seconds), the focus is returned to the search field 504. In another embodiment, if the user does not interact with the search field 504 within a specified period of time, the focus dictated by the loaded web page, if any, is allowed to occur. Additionally, in an embodiment where a search field having immediate feedback capability is presented as part of a web page, such as field 512 of FIG. 5A, the focus may be maintained on the web page search field 512.

Many web browser applications include a history feature, which records the URLs of web pages that have been recently visited. Web browser applications typically allow you to view the history and click on any URL therein to revisit the respective web page. Many browsers also allow users to specify how many days of history to keep and provide the ability to delete the history record. The immediate search feedback method 300 of the present invention may be used in conjunction with a web browser's history function. In one embodiment, during the course of typing a search term, a plurality of URLs for search results pages may be "visited" by the user. By way of example, as illustrated by the sequence of FIGS. 5A-5E, in one embodiment, if a user types ipod into the search field, four distinct results pages may be presented to the user during the course of the input-one displaying results for a query based on the string consisting of i, another with results for ip, another displaying results for ipo, and another for the full query ipod. The first three results pages (i.e. those for the i, ip, and ipo queries) may be referred to as intermediate search results pages, since they represent results of queries using intermediate or partial search strings; partial meaning they typically include fewer characters than the final, complete, search string entered by the user. The cumulative input string prior to a user selecting one of the results presented by the results web page (or otherwise navigating away from the results page) may be referred to as a final or complete query string.

Figure 6A:
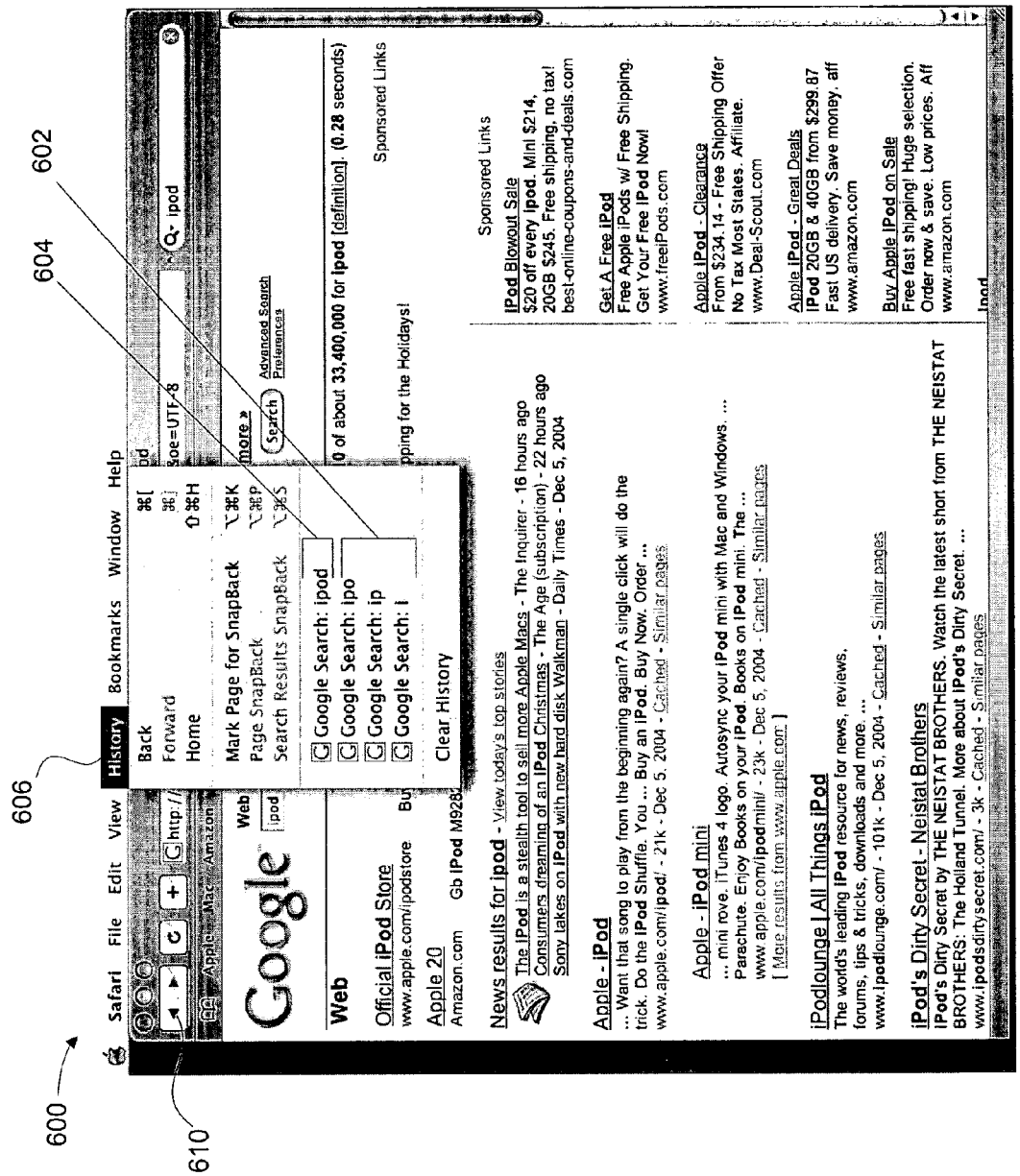
FIGS. 6A-6B illustrate embodiments of a GUI for a web browser application including immediate search feedback functionality.
Figure 6B:
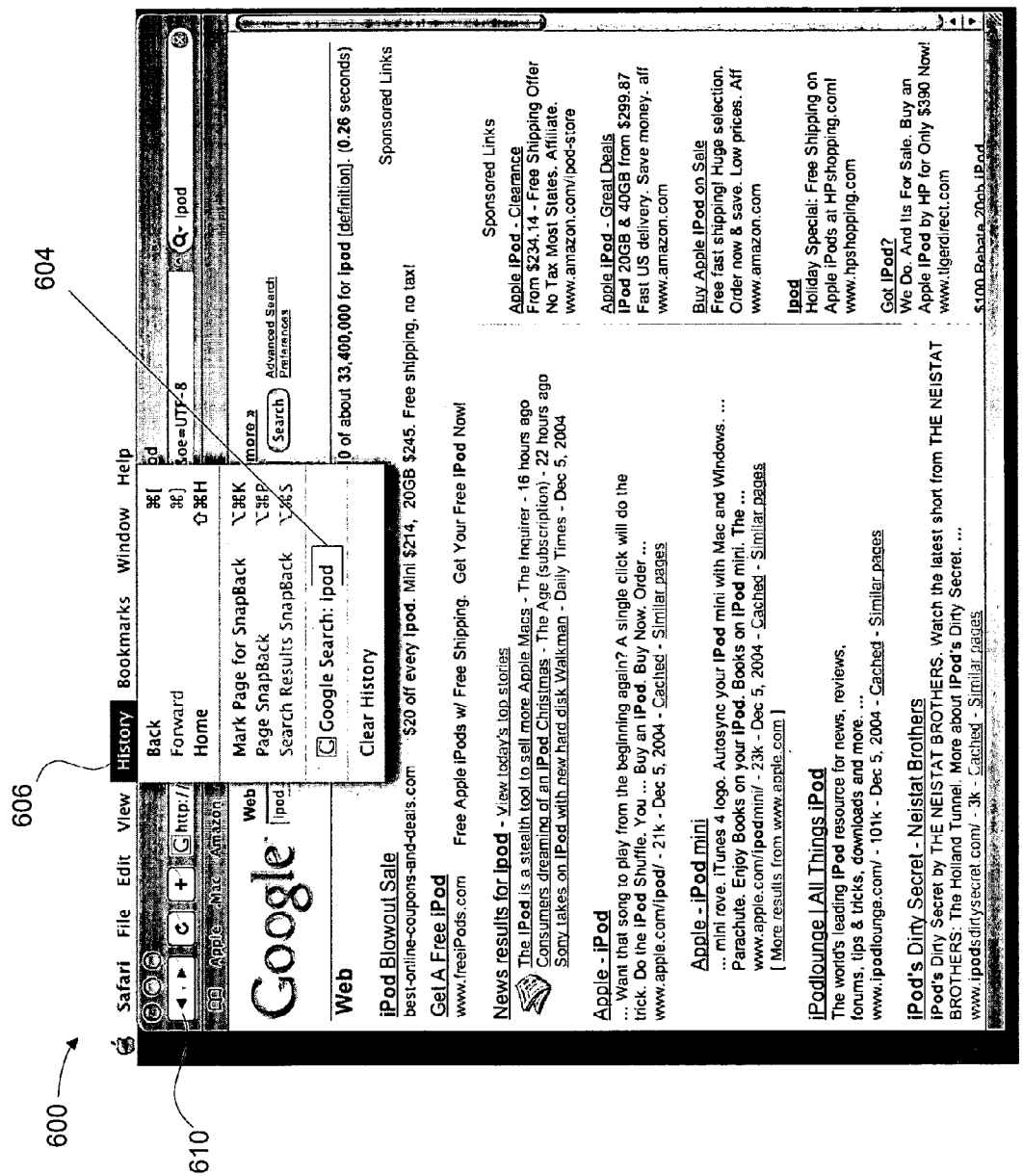

FIG. 6A illustrates an embodiment of a GUI 600 for a web browser application implementing the immediate search feedback method 300, such as that described above with respect to FIGS. 5A-5E. In one embodiment, illustrated in FIG. 6A using the exemplary search term ipod, the URLs of all intermediate search results pages 602 (e.g. the i, ip, and ipo results pages of the previous example) are stored as part of the browser's history record 606, in addition to the URL of the final search results page 604 (e.g. the ipod results page). In another embodiment, illustrated in FIG. 6B, only the URL for the results page of the final/complete search term 604 (e.g. the ipod results page). In one embodiment, all result page URLs for intermediate searches as well as the final search results URL are stored together in a folder. For example, in one embodiment, in the case of the ipod search, a folder accessible under the browser's history menu may be titled ipod (to reflect the final search string), and may include within it the URLs of results pages for all of the intermediate searches as well as the final results URL. A URL within the folder may be highlighted to indicate the final search results page presented to the user before the user selected one of the results from the page. In another embodiment, as a user types, a URL of a results page is periodically (e.g. once every 3 seconds or every other intermediate URL accessed) stored in the history associated with that particular search. In another embodiment, where a user inputs a plurality of words into a search field, only the URLs of results pages for the queries that included complete words are stored in for the history associated with that particular search.

In another embodiment, intermediate results pages are not stored as part of the history, but only the most recently displayed results page presented to a user just prior to selecting one of the displayed results (this page may be referred to as the final results page) is stored in the history. For example, consider the situation of a user typing in the two consecutive search terms cat dog into a search field. After being presented with the results of the "cat dog" search, the user revises the search by backspacing over dog and typing canine. After being presented with the results of the cat canine search, the user clicks on one of the hyperlinks presented on the cat canine results page. In this embodiment, only the results page for the cat canine search is stored in the history, since the user's input (clicking on one of the results of that page) indicates that that particular results page was likely the most interesting and relevant to the user, since its results elicited a positive response from the user (e.g. clicking on one of the displayed results). Any intermediate results pages, such as that for the cat dog search, would be omitted from the history records of the browser. This may reduce cluttering the history list with unnecessarily duplicative, incomplete, or redundant entries, while preserving the results pages that are most likely to be relevant and of importance to the user. In one embodiment, a user may select whether to keep all intermediate searches in the history, or only those deemed likely to be relevant by the browser application, as described above.

In one embodiment, the functionality of the back button (e.g. 610 of FIG. 6A) of the browser may be configured similarly to that of the history function. A back button in a browser is typically used to return to the last page viewed. In one embodiment, after a search using the immediate search feedback aspect has been performed, the back button may be used to return to the last non-results page visited. For example, consider the situation where a user is browsing www.apple.com, then types ipod into the browser's integrated search field. In this example, three intermediate pages (those for i, ip, and ipo) may be presented to the user before the final complete ipod search results page is displayed. In one embodiment, clicking on the back button of the browser once will return the browser to the results page for the ipo search, since it was the last page visited. In an alternative embodiment, clicking on the back button of the browser once will return the browser to the www.apple.com web page, since it was the last page visited before the "ipod" search was initiated by the user.

Figure 7:
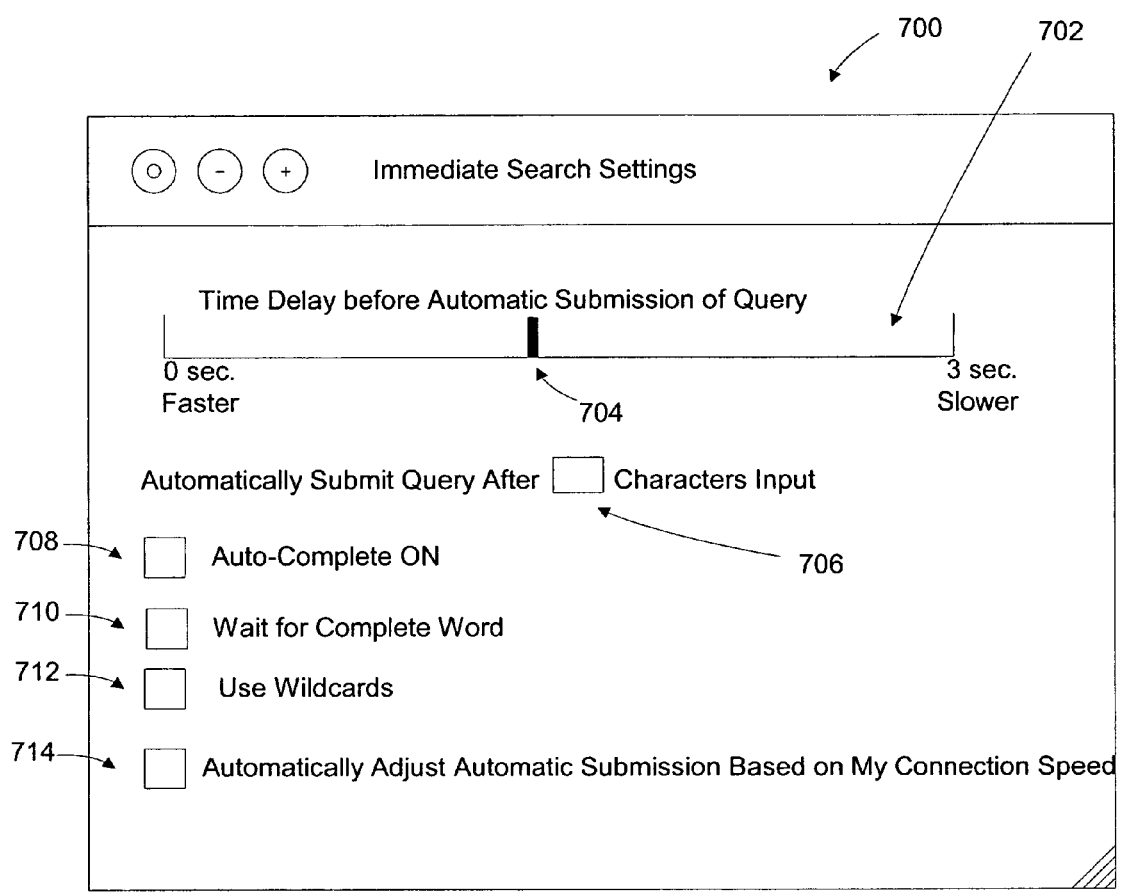
FIG. 7 illustrates an embodiment of a user interface for setting or adjusting various parameters relating to immediate search feedback.

FIG. 7 illustrates an embodiment of a user interface 700 for setting or adjusting various parameters relating to immediate search feedback, such as the temporal and substantive triggers. As described above, in one embodiment, certain aspects of the immediate search feedback may be adjusted or specified by a user through interaction with the user interface 700. The user interface 700 is displayed as a graphical user interface (GUI) object. Examples of GUI objects include windows (e.g. document, application, utility, dialog and alert windows), sheets, lists, menus (e.g. popup menus, pull-down menus), title bars, menu bars, toolbars, taskbars, palettes, clipboards, docks, and drawers (a child window that slides out from a parent window), among others. The user-adjustable parameters illustrated in the user interface 700 are not exhaustive; it will be appreciated that any of the various triggers, thresholds, and parameters discussed above may be set, specified, or adjusted by a user through a graphical user interface, such as for example that illustrated in FIG. 7. Furthermore, the specific user-manipulable control elements (e.g. buttons, sliders, check boxes, etc.) in FIG. 7 as they relate to specific parameters of the immediate search are merely illustrative of one embodiment of the invention; use of various other control elements are contemplated for controlling different parameters. Examples of such user-manipulable control elements include buttons, selection controls, sliders, radio buttons, checkboxes, menus, pop-up menus, pull-down menus, fields, text input fields, selection fields or other input fields, among others.

In one embodiment, the user interface 700 is presented as a window with control elements therein. In one embodiment, the user interface 700 includes a slider control 702 to adjust the time delay before a query is automatically submitted based on the received input (i.e. the temporal trigger). The slider control 702 allows a user to choose from a continuous range of allowable values. For example, in one embodiment, a user may manipulate a slider 704 to adjust the time delay between about 0 seconds and about 3 seconds. Other ranges of time may be used with other embodiments. In another embodiment, a user may specify a number of input characters, after which a query is automatically submitted. For example, a user may input a number into field 706, such as 4; in such a case, after four characters are input into a search field (such as search field 504 of FIG. 5A), a search query is automatically submitted. In one embodiment, various checkboxes (or other control elements, such as radio buttons) may be used to allow a user to control other aspects of the immediate search feedback, such as for example whether to turn the auto-complete feature on 708 (as described above), whether to delay a search until the input matches a recognized complete word 710 (as described above), whether to append wildcards to automatically submitted search query strings 712 (as described above), and whether to automatically adjust the automatic submission thresholds based on a connection speed 714 (as discussed above).

In one embodiment, an application programming interface (API) may be provided in a computing system to allow an application program to set or adjust the settings relating to immediate search feedback, such as the temporal and substantive triggers for automatically submitting a query. An API is an interface through which an application program can access an operating system of a computing device. For example, in one embodiment, a first software component may monitor a user's typing behavior/pattern to determine a timing parameter. For example, the first software component may monitor or record timing characteristics when a plurality of keys are actuated (e.g. the average time/delay/pause between successive input of text characters within a word processing application). Based on the observed typing pattern, a timing parameter is set. In one embodiment, for example, the timing parameter may be the average time elapsed between successive input of text characters. Through an API, the first software component may call a second software component (e.g. the operating system) to set a temporal threshold specified by the second software component. The temporal threshold may then be used to determine when to automatically submit a query to a search engine (i.e. the threshold specifies the duration of the pause when receiving text input, after which a search query may be automatically submitted).

The methods described above constitute computer programs made up of computer-executable instructions illustrated as blocks (acts) within the flow charts of FIGS. 3 and 4. Describing the methods by reference to a flow chart enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in FIGS. 3 and 4 without departing from the scope of the invention and that no particular order is implied by the arrangement of blocks shown and described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A machine-implemented method comprising:
    receiving first search input within a search field of a web browser application;
    determining, based on characteristics of the first search input, whether the first search input triggers an automatic submission of a first query to a search engine;
    determining, based on characteristics of the first search input, whether to delay the trigger for automatic submission, wherein the first query is automatically submitted to the search engine if the first search input satisfies a temporal trigger, wherein the temporal trigger is based upon a connection speed to the search engine;
    automatically submitting the first query to the search engine, the first query based on the received first search input; and
    displaying, within the web browser application, a first results web page returned from the first query submitted to the search engine.

2. The method of claim 1, wherein the search engine is an Internet search engine.

3. The method of claim 1, wherein the search input includes a portion of a keyword.

4. The method of claim 1, wherein the search field is included in a toolbar of the web browser application.

5. The method of claim 1, wherein the search field is included in a web page presented by the web browser application.

6. The method of claim 1, further comprising:
    receiving second search input within the search field, the second search input added to the first search input to create cumulative search input;
    determining, based on characteristics of the cumulative search input, whether the cumulative search input triggers an automatic submission of a second query to a search engine;
    determining, based on characteristics of the cumulative search input, whether to delay the trigger for automatic submission;
    automatically submitting the second query to the search engine, the second query based on the cumulative search input; and
    displaying, within the web browser application, a second results web page returned from the second query submitted to the search engine, wherein the second results web page replaces the first results web page.

7. The method of claim 6, wherein a uniform resource locator (URL) associated with the first results web page is stored within a record of web pages accessed by the web browser application.

8. The method of claim 1, wherein the temporal trigger is satisfied if a length of elapsed time without receiving further search input in addition to the first search input is greater than a predetermined time.

9. The method of claim 8, wherein the predetermined time is based on an average pause between typing successive characters by a user.

10. The method of claim 1, wherein the first query is automatically submitted to the search engine if the first search input satisfies a substantive trigger.

11. The method of claim 10, wherein a substantive trigger is satisfied if the first search input includes at least one space character.

12. The method of claim 1, further comprising:
    receiving a selection of a first result from the first results web page, the first result associated with a first uniform resource locator (URL);
    displaying a first web page associated with the first URL;
    storing the first URL within a record of accessed web pages.

13. An apparatus comprising:
    means for receiving, through a hardware input device, first search input within a search field of a web browser application;
    means for determining, based on characteristics of the first search input, whether the first search input triggers an automatic submission of a first query to a search engine;
    means for determining, based on characteristics of the first search input, whether to delay the trigger for automatic submission, wherein the first query is automatically submitted to the search engine if the first search input satisfies a temporal trigger, wherein the temporal trigger is based upon a connection speed to the search engine;

means for automatically submitting the first query to the search engine, the first query based on the received first search input; and means for displaying, within the web browser application, a first results web page returned from the first query submitted to the search engine.

14. The apparatus of claim 13, wherein the search engine is an Internet search engine.

15. The apparatus of claim 13, wherein the search input includes a portion of a keyword.

16. The apparatus of claim 13, wherein the search field is included in a toolbar of the web browser application.

17. The apparatus of claim 13, wherein the search field is included in a web page presented by the web browser application.

18. The apparatus of claim 13, further comprising:

means for receiving second search input within the search field, the second search input added to the first search input to create cumulative search input;

means for determining, based on characteristics of the cumulative search input, whether the cumulative search input triggers an automatic submission of a second query to a search engine;

means for determining, based on characteristics of the cumulative search input, whether to delay the trigger for automatic submission;

means for automatically submitting the second query to the search engine, the second query based on the cumulative search input; and means for displaying, within the web browser application, a second results web page returned from the second query submitted to the search engine, wherein the second results web page replaces the first results web page.

19. The apparatus of claim 18, wherein a uniform resource locator (URL) associated with the first results web page is stored within a record of web pages accessed by the web browser application.

20. The apparatus of claim 13, wherein the temporal trigger is satisfied if a length of elapsed time without receiving further search input in addition to the first search input is greater than a predetermined time.

21. The apparatus of claim 20, wherein the predetermined time is based on an average pause between typing successive characters by a user.

22. The apparatus of claim 13, wherein the first query is automatically submitted to the search engine if the first search input satisfies a substantive trigger.

23. The apparatus of claim 22, wherein a substantive trigger is satisfied if the first search input includes at least one space character.

24. The apparatus of claim 13, further comprising:

means for receiving a selection of a first result from the first results web page, the first result associated with a first uniform resource locator (URL);

means for displaying a first web page associated with the first URL;

means for storing the first URL within a record of accessed web pages.

25. A machine-readable storage medium storing executable instructions to cause a machine to perform a machine-implemented method comprising:

receiving first search input within a search field of a web browser application;

determining, based on characteristics of the first search input, whether the first search input triggers an automatic submission of a first query to a search engine;

determining, based on characteristics of the first search input, whether to delay the trigger for automatic submission, wherein the first query is automatically submitted to the search engine if the first search input satisfies a temporal trigger, wherein the temporal trigger is based upon a connection speed to the search engine;

automatically submitting the first query to the search engine, the first query based on the received first search input; and displaying, within the web browser application, a first results web page returned from the first query submitted to the search engine.

26. The machine-readable storage medium of claim 25, wherein the search engine is an Internet search engine.

27. The machine-readable storage medium of claim 25, wherein the search input includes a portion of a keyword.

28. The machine-readable storage medium of claim 25, wherein the search field is included in a toolbar of the web browser application.

29. The machine-readable storage medium of claim 25, wherein the search field is included in a web page presented by the web browser application.

30. The machine-readable storage medium of claim 25, wherein the method further comprises:

receiving second search input within the search field, the second search input added to the first search input to create cumulative search input;

determining, based on characteristics of the cumulative search input, whether the cumulative search input triggers an automatic submission of a second query to a search engine;

determining, based on characteristics of the cumulative search input, whether to delay the trigger for automatic transmission;

automatically submitting the second query to the search engine, the second query based on the cumulative search input; and displaying, within the web browser application, a second results web page returned from the second query submitted to the search engine, wherein the second results web page replaces the first results web page.

31. The machine-readable storage medium of claim 30, wherein a uniform resource locator (URL) associated with the first results web page is stored within a record of web pages accessed by the web browser application.

32. The machine-readable storage medium of claim 25, wherein the temporal trigger is satisfied if a length of elapsed time without receiving further search input in addition to the first search input is greater than a predetermined time.

33. The machine-readable storage medium of claim 32, wherein the predetermined time is based on an average pause between typing successive characters by a user.

34. The machine-readable storage medium of claim 25, wherein the first query is automatically submitted to the search engine if the first search input satisfies a substantive trigger.

35. The machine-readable storage medium of claim 34, wherein a substantive trigger is satisfied if the first search input includes at least one space character.

36. The machine-readable storage medium of claim 25, wherein the method further comprises:

receiving a selection of a first result from the first results web page, the first result associated with a first uniform resource locator (URL);

displaying a first web page associated with the first URL; and storing the first URL within a record of accessed web pages.

37. A machine-implemented method comprising:
receiving search input from a user;
determining, based on substantive characteristics of the search input, whether the first search input triggers an automatic submission of a query to an Internet search engine;
determining, based on substantive characteristics of the first search input, whether to delay the trigger for automatic submission, wherein the query is automatically submitted to the search engine if the search input satisfies a temporal trigger, wherein the temporal trigger is based upon a connection speed to the search engine;
automatically submitting the query to the search engine, the query based on the received search input; and
displaying results of the query.

38. The method of claim 37, wherein determining whether to automatically submit the query to the Internet search engine further comprises:
determining whether the search input satisfies a substantive trigger.

39. The method of claim 37, wherein the search input includes text.

40. An apparatus comprising:
means for receiving, through a hardware input device, search input from a user;
means for determining, based on substantive characteristics of the search input, whether the first search input triggers an automatic submission of a query to an Internet search engine;
means for determining, based on substantive characteristics of the search input, whether to delay the trigger for automatic submission, wherein the query is automatically submitted to the search engine if the search input satisfies a temporal trigger, wherein the temporal trigger is based upon a connection speed to the search engine;
means for automatically submitting the query to the search engine, the query based on the received search input; and
means for displaying results of the query.

41. The apparatus of claim 40, wherein the means for determining whether the first search input triggers an automatic submission of the query to the Internet search engine further comprises:
means for determining whether the search input satisfies a substantive trigger.

42. The apparatus of claim 40, wherein the search input includes text.

43. A machine-readable storage medium storing executable instructions to cause a machine to perform a machine-implemented method comprising:
receiving search input from a user;
determining, based on substantive characteristics of the search input, whether the search input triggers an automatic submission of a query to an Internet search engine;
determining, based on substantive characteristics of the search input, whether to delay the trigger for automatic submission, wherein the query is automatically submitted to the search engine if the search input satisfies a temporal trigger, wherein the temporal trigger is based upon a connection speed to the search engine;
automatically submitting the query to the search engine, the query based on the received search input; and
displaying results of the query.

44. The machine-readable storage medium of claim 43, wherein determining whether the search input triggers an automatic submission of the query to the Internet search engine further comprises:
determining whether the search input satisfies a substantive trigger.

45. The machine-readable storage medium of claim 43, wherein the search input includes text.

46. A machine-implemented method comprising:
receiving text input within an integrated search field of a web browser application, through a hardware input device;
determining, based on characteristics of the text input, whether the text input triggers an automatic submission of a query to a search engine;
determining, based on characteristics of the text input, whether to delay the trigger for automatic submission, wherein the query is automatically submitted to the search engine if the text input satisfies a temporal trigger, wherein the temporal trigger is based upon a connection speed to the search engine;
automatically submitting the query to the search engine, the query based on the received search input;
displaying, within the web browser application, a web page returned from the search engine based on the query; and
automatically maintaining a focus within the integrated search field after the returned web page is displayed, the focus designating where the text input is directed.

47. The method of claim 46, further comprising preventing the returned web page from controlling the focus.

48. The method of claim 46, wherein the returned web page includes results returned from the query submitted to the search engine.

49. The method of claim 48, further comprising:
receiving a selection of a first result from the returned web page, the first result associated with a first uniform resource locator (URL);
displaying a first web page associated with the first URL;
preventing the first web page from controlling the focus.

50. The method of claim 49, further comprising permitting the first web page to control the focus if no additional input is received within the search field within a predetermined period of time.

51. The method of claim 50, wherein the characteristics of the text input include both temporal and substantive characteristics.

52. An apparatus comprising:
means for receiving, through a hardware input device, text input within an integrated search field of a web browser application;
means for determining, based on characteristics of the text input, whether the text input triggers an automatic submission of a query to a search engine;
means for determining, based on characteristics of the text input, whether to delay the trigger for automatic submission, wherein the query is automatically submitted to the search engine if the text input satisfies a temporal trigger, wherein the temporal trigger is based upon a connection speed to the search engine;
means for automatically submitting the query to the search engine, the query based on the received search input;
means for displaying, within the web browser application, a web page returned from the search engine based on the query; and means for automatically maintaining a focus within the integrated search field after the returned web page is displayed, the focus designating where the text input is directed.

53. The apparatus of claim 52, further comprising means for preventing the returned web page from controlling the focus.

54. The apparatus of claim 52, wherein the returned web page includes results returned from the query submitted to the search engine.

55. The apparatus of claim 54, further comprising:
means for receiving a selection of a first result from the returned web page, the first result associated with a first uniform resource locator (URL);
means for displaying a first web page associated with the first URL;
means for preventing the first web page from controlling the focus; and
means for permitting the first web page to control the focus if no additional input is received within the search field within a predetermined period of time.

56. The apparatus of claim 55, wherein the characteristics of the text input include both temporal and substantive characteristics.

57. A machine-readable storage medium storing instructions to cause a machine to perform a machine-implemented method comprising:
receiving text input within an integrated search field of a web browser application;
determining, based on characteristics of the text input, whether the text input triggers an automatic submission of a query to a search engine;
determining, based on characteristics of the text input, whether to delay the trigger for automatic submission, wherein the query is automatically submitted to the search engine if the text input satisfies a temporal trigger, wherein the temporal trigger is based upon a connection speed to the search engine;
automatically submitting the query to the search engine, the query based on the received search input;
displaying, within the web browser application, a web page returned from the search engine based on the query; and
automatically maintaining a focus within the integrated search field after the returned web page is displayed, the focus designating where the text input is directed.

58. The machine-readable storage medium of claim 57, wherein the method further comprises preventing the returned web page from controlling the focus.

59. The machine-readable storage medium of claim 57, wherein the returned web page includes results returned from the query submitted to the search engine.

60. The machine-readable storage medium of claim 59, wherein the method further comprises:
receiving a selection of a first result from the returned web page, the first result associated with a first uniform resource locator (URL);
displaying a first web page associated with the first URL;
preventing the first web page from controlling the focus; and
permitting the first web page to control the focus if no additional input is received within the search field within a predetermined period of time.

61. The machine-readable storage medium of claim 60, wherein the characteristics of the text input include both temporal and substantive characteristics.

62. A machine-implemented method comprising:
receiving first text input within a search field of a web page;
determining, based on characteristics of the first text input, whether the first text input triggers an automatic submission of a first query to an Internet search engine;
determining, based on characteristics of the first text input, whether to delay the trigger for automatic submission, wherein the first query is automatically submitted to the search engine if the first text input satisfies a temporal trigger, wherein the temporal trigger is based upon a connection speed to the search engine;
automatically submitting the first query to the search engine, the first query based on the received first search input; and
presenting, within the web page, first results returned from the first query submitted to the search engine.

63. The method of claim 62, wherein the search field is presented within a first frame of the web page, and wherein the first results are presented within in a second frame of the web page.

64. The method of claim 63, further comprising:
receiving second text input within the search field, the second text input added to the first search input to create cumulative text input;
determining, based on characteristics of the cumulative text input, whether the cumulative text input triggers an automatic submission of a second query to the search engine;
determining, based on characteristics of the cumulative text input, whether to delay the trigger for automatic submission;
automatically submitting the second query to the search engine, the second query based on the received cumulative text input; and
presenting, within the second frame of the web page, second results returned from the second query submitted to the search engine, wherein the second results replace the first results.

65. An apparatus comprising:
means for receiving, through a hardware input device, first text input within a search field of a web page;
means for determining, based on characteristics of the first text input, whether the first text input triggers an automatic submission of a first query to an Internet search engine;
means for determining, based on characteristics of the first text input, whether to delay the trigger for automatic transmission, wherein the first query is automatically submitted to the search engine if the first text input satisfies a temporal trigger, wherein the temporal trigger is based upon a connection speed to the search engine;
means for automatically submitting the first query to the search engine, the first query based on the received first search input; and
means for presenting, within the web page, first results returned from the first query submitted to the search engine.

66. The apparatus of claim 65, wherein the search field is presented within a first frame of the web page, and wherein the first results are presented within in a second frame of the web page.

67. The apparatus of claim 66, further comprising:
means for receiving second text input within the search field, the second text input added to the first search input to create cumulative text input;
means for determining, based on characteristics of the cumulative text input, whether the cumulative text input triggers an automatic submission of a second query to the search engine;

means for determining, based on characteristics of the cumulative text input, whether to delay the trigger for automatic submission;

means for automatically submitting the second query to the search engine, the second query based on the received cumulative text input; and means for presenting, within the second frame of the web page, second results returned from the second query submitted to the search engine, wherein the second results replace the first results.

68. A machine-readable storage medium storing executable instructions to cause a machine to perform a machine-implemented method comprising:

receiving first text input within a search field of a web page;

determining, based on characteristics of the first text input, whether the first text input triggers an automatic submission of a first query to an Internet search engine;

determining, based on characteristics of the first text input, whether to delay the trigger for automatic submission, wherein the first query is automatically submitted to the search engine if the first text input satisfies a temporal trigger, wherein the temporal trigger is based upon a connection speed to the search engine;

automatically submitting the first query to the search engine, the first query based on the received first search input; and presenting, within the web page, first results returned from the first query submitted to the search engine.

69. The machine-readable storage medium of claim 68, wherein the search field is presented within a first frame of the web page, and wherein the first results are presented within in a second frame of the web page.

70. The machine-readable storage medium of claim 69, wherein the method further comprises:

receiving second text input within the search field, the second text input added to the first search input to create cumulative text input;

determining, based on characteristics of the cumulative text input, whether the cumulative text input triggers an automatic submission of a second query to the search engine;

determining, based on characteristics of the cumulative text input, whether to delay the trigger for automatic submission;

automatically submitting the second query to the search engine, the second query based on the received cumulative text input; and presenting, within the second frame of the web page, second results returned from the second query submitted to the search engine, wherein the second results replace the first results.

71. A machine-implemented method comprising:
displaying a graphical user interface (GUI) object; and
displaying at least one user-manipulable control element within the GUI object, the user-manipulable control element manipulable to specify a parameter used in determining whether to automatically submit received search input as a query to a search engine, wherein the query is automatically submitted to the search engine if the search input satisfies a temporal trigger, wherein the temporal trigger is based upon a connection speed to the search engine; and wherein the parameter includes at least one of temporal and substantive triggers, and delays.

72. The method of claim 71, further comprising:
receiving input through the user-manipulable control element, the input specifying the parameter.

73. The method of claim 72, further comprising:
automatically submitting a first query to the search engine based on the specified parameter.

74. The method of claim 73, wherein the parameter is a temporal trigger specifying a length of elapsed time without receiving additional search input.

75. The method of claim 71, wherein the user-manipulable control element is a slider bar.

76. An apparatus comprising:
means for displaying a graphical user interface (GUI) object; and
means for displaying at least one user-manipulable control element within the GUI object, the user-manipulable control element manipulable to specify a parameter used in determining whether to automatically submit received search input as a query to a search engine, wherein the query is automatically submitted to the search engine if the search input satisfies a temporal trigger, wherein the temporal trigger is based upon a connection speed to the search engine.

77. The apparatus of claim 76, further comprising:
means for receiving input through the user-manipulable control element, the input specifying the parameter.

78. The apparatus of claim 77, further comprising:
means for automatically submitting a first query to the search engine based on the specified parameter.

79. The apparatus of claim 78, wherein the parameter is a temporal trigger specifying a length of elapsed time without receiving additional search input.

80. A machine-implemented method for providing an interface between a first software component and a second software component, the method comprising:

the first software component determining a timing parameter based on when a plurality of keys are actuated; and the first software component causing a temporal threshold specified by the second software component to be set to the determined timing parameter, the temporal threshold to determine if the actuation of the plurality of keys triggers an automatic submission of a query to a search engine, wherein the temporal threshold is based upon a connection speed to the search engine.

81. The method of claim 80, further comprising:
receiving first search input within a search field of a web browser application;

determining, based on characteristics of the first search input, a length of elapsed time without receiving further search input in addition to the first search input;

calling the second software component to determine the temporal threshold;

determining whether a trigger for an automatic submission of the first query is satisfied by determining whether the length of the elapsed time is greater than the temporal threshold;

determining whether to delay the trigger for automatic transmission of the first query;

automatically submitting the first query to the search engine.

82. A machine-readable storage medium storing executable instructions to cause a machine to perform a machine-implemented method for providing an interface between a first software component and a second software component, the method comprising:

the first software component determining a timing parameter based on when a plurality of keys are actuated; and the first software component causing a temporal threshold specified by the second software component to be set to the determined timing parameter, the temporal threshold to determine when a trigger for automatic submission of the query is satisfied, and whether to delay the trigger for automatic submission of a query to a search engine, wherein the temporal threshold is based upon a connection speed to the search engine.

83. The machine-readable storage medium of claim 82, wherein the method further comprises:

receiving first search input within a search field of a web browser application;

determining, based on characteristics of the first search input, a length of elapsed time without receiving further search input in addition to the first search input;

calling the second software component to determine the temporal threshold;

determining, based on characteristics of the first search input, whether the first search input triggers an automatic submission of a first search query to a search engine;

determining, based on characteristics of the first search input, whether to delay the trigger for automatic transmission of the query;

automatically submitting the first query to the search engine if the length of the elapsed time is greater than the temporal threshold.

84. A machine-implemented method comprising:

receiving, through a hardware input device, a first search input within a search field of a web browser application;

determining, based on characteristics of the first search input, whether the first search input triggers an automatic submission of a first query to a search engine;

determining, based on characteristics of the first search input, whether to delay the trigger for automatic transmission, wherein the first query is automatically submitted to the search engine if the first search input satisfies a temporal trigger, wherein the temporal trigger is based upon a connection speed to the search engine;

automatically submitting the first query to the search engine, the first query based on the received first search input; and determining whether a first results web page returned by the search engine based on the submitted first query includes a suggestion for an alternate spelling of a term within the first search input.

85. The method of claim 84, further comprising:

automatically submitting a second query to the search engine, the second query based on a suggestion; wherein said suggestion is for an alternative spelling of a term within the first search input; and displaying, within the web browser application, a second results web page returned from the second query submitted to the search engine.

86. The method of claim 85, wherein the first results web page is not displayed within the web browser application.

87. The method of claim 84, further comprising:

automatically displaying at least a portion of a suggestion within the search field; wherein said suggestion is for an alternative spelling of a term within the first search input.

88. An apparatus comprising:

means for receiving, through a hardware input device, a first search input within a search field of a web browser application;

means for determining, based on characteristics of the first search input, whether the first search input triggers an automatic submission of a first query to a search engine;

means for determining, based on characteristics of the first search input, whether to delay the trigger for automatic submission, wherein the first query is automatically submitted to the search engine if the first search input satisfies a temporal trigger, wherein the temporal trigger is based upon a connection speed to the search engine;

means for automatically submitting the first query to the search engine, the first query based on the received first search input; and means for determining whether a first results web page returned by the search engine based on the submitted first query includes a suggestion for an alternate spelling of a term within the first search input.

89. The apparatus of claim 88, further comprising:

means for automatically submitting a second query to the search engine, the second query based on the suggestion; wherein said suggestion is for an alternative spelling of a term within the first search input; and means for displaying, within the web browser application, a second results web page returned from the second query submitted to the search engine.

90. The apparatus of claim 89, wherein the first results web page is not displayed within the web browser application.

91. The apparatus of claim 88, further comprising:

means for displaying within the search field, at least a portion of a suggestion that is included within the first results web page; said first results web page is returned based on the submitted first query; and said suggestion is for an alternative spelling of a term within the first search output.

* * * * *

UNITED STATES PATENT AND TRADEMARK OFFICE
CERTIFICATE OF CORRECTION

| | | |
|---|---|---|
| PATENT NO. | : 7,788,248 B2 | Page 1 of 1 |
| APPLICATION NO. | : 11/076473 | |
| DATED | : August 31, 2010 | |
| INVENTOR(S) | : Scott James Forstall et al. | |

It is certified that error appears in the above-identified patent and that said Letters Patent is hereby corrected as shown below:

Title Page;

On the first page, in field (56), in column 2, under "Other Publications", line 9, delete "Unkown," and insert -- Unknown, --, therefor.

On the first page, in field (56), in column 2, under "Other Publications", line 13, delete "spotlight$_{13}$" and insert -- spotlight_ --, therefor.

Signed and Sealed this
Twenty-second Day of November, 2011

David J. Kappos
*Director of the United States Patent and Trademark Office*